United States Patent
Li et al.

(10) Patent No.: US 12,258,726 B2
(45) Date of Patent: Mar. 25, 2025

(54) OPERATION SUPPORT SYSTEM FOR CONSTRUCTION MACHINE AND CONSTRUCTION MACHINE

(71) Applicant: SUMITOMO HEAVY INDUSTRIES, LTD., Tokyo (JP)

(72) Inventors: Mengmeng Li, Kanagawa (JP); Masaki Ogawa, Kanagawa (JP); Ayano Shinato, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 1120 days.

(21) Appl. No.: 17/036,325

(22) Filed: Sep. 29, 2020

(65) Prior Publication Data

US 2021/0012163 A1 Jan. 14, 2021

Related U.S. Application Data

(63) Continuation of application No. PCT/JP2019/014344, filed on Mar. 29, 2019.

(30) Foreign Application Priority Data

Mar. 30, 2018 (JP) ................................ 2018-070359

(51) Int. Cl.
*E02F 3/43* (2006.01)
*E02F 9/20* (2006.01)
(Continued)

(52) U.S. Cl.
CPC ............ *E02F 3/434* (2013.01); *E02F 9/2045* (2013.01); *E02F 9/261* (2013.01);
(Continued)

(58) Field of Classification Search
CPC ......... E02F 9/2045; E02F 9/261; E02F 3/437; E02F 3/438; E02F 9/2054; E02F 9/262;
(Continued)

(56) References Cited

U.S. PATENT DOCUMENTS

| 6,076,030 A | 6/2000 | Rowe |
| 7,751,954 B2 | 7/2010 | Matsuda et al. |

(Continued)

FOREIGN PATENT DOCUMENTS

| JP | H05-026896 | 4/1993 |
| JP | H07-160661 | 6/1995 |

(Continued)

OTHER PUBLICATIONS

International Search Report for PCT/JP2019/014344 mailed on Jun. 18, 2019.

*Primary Examiner* — Adam R Mott
*Assistant Examiner* — Sagar KC
(74) *Attorney, Agent, or Firm* — IPUSA, PLLC

(57) ABSTRACT

An operation support system for a construction machine includes a memory that stores a program and a processor configured to execute the program stored in the memory to perform a process. The process includes generating multiple operation patterns or multiple arrangement patterns for the construction machine such that a rating regarding a predetermined target index becomes relatively high, obtaining environmental information of the construction machine to be supported, and outputting, based on the multiple operation patterns or the multiple arrangement patterns, an operation pattern or an arrangement pattern with which the rating regarding the predetermined target index of an operation of the construction machine to be supported becomes relatively high under an environment corresponding to the obtained environmental information.

7 Claims, 10 Drawing Sheets

(51) Int. Cl.
*E02F 9/26* (2006.01)
*G06F 18/21* (2023.01)
*G06F 18/214* (2023.01)
*G06N 20/00* (2019.01)
*G06V 10/778* (2022.01)
*G06V 20/13* (2022.01)
*G06V 20/17* (2022.01)
*G06V 20/56* (2022.01)

(52) U.S. Cl.
CPC ...... *G06F 18/2148* (2023.01); *G06F 18/2185* (2023.01); *G06N 20/00* (2019.01); *G06V 10/7788* (2022.01); *G06V 20/13* (2022.01); *G06V 20/17* (2022.01); *G06V 20/56* (2022.01)

(58) Field of Classification Search
CPC ........... E02F 9/26; E02F 9/2025; E02F 3/434; G06F 18/2148; G06F 18/2185; G06N 20/00; G06N 7/01; G06N 3/006; G06V 10/7788; G06V 20/13; G06V 20/56; G06V 20/17
See application file for complete search history.

(56) References Cited

U.S. PATENT DOCUMENTS

| | | | |
|---|---|---|---|
| 9,988,791 B2* | 6/2018 | Uji | B60R 16/0234 |
| 10,373,406 B2 | 8/2019 | Egawa | |
| 2012/0089327 A1* | 4/2012 | Miura | G01C 21/3469 |
| | | | 701/411 |
| 2014/0032087 A1* | 1/2014 | Shiri | G01C 21/3469 |
| | | | 701/123 |
| 2016/0247332 A1* | 8/2016 | Egawa | E02F 9/264 |
| 2016/0282878 A1* | 9/2016 | Stratton | G09B 25/06 |
| 2016/0326725 A1* | 11/2016 | Stratton | E02F 9/262 |
| 2016/0349733 A1* | 12/2016 | Talmaki | E02F 9/205 |
| 2018/0089563 A1* | 3/2018 | Redding | G06N 5/01 |
| 2018/0374168 A1 | 12/2018 | Kano et al. | |
| 2019/0003152 A1 | 1/2019 | Nakamura et al. | |

FOREIGN PATENT DOCUMENTS

| | | |
|---|---|---|
| JP | H11-315556 | 11/1999 |
| JP | 2001-142506 | 5/2001 |
| JP | 2005-098076 | 4/2005 |
| JP | 2016-156193 | 9/2016 |
| JP | 2017-014726 | 1/2017 |
| WO | 2017/170968 | 10/2017 |

* cited by examiner

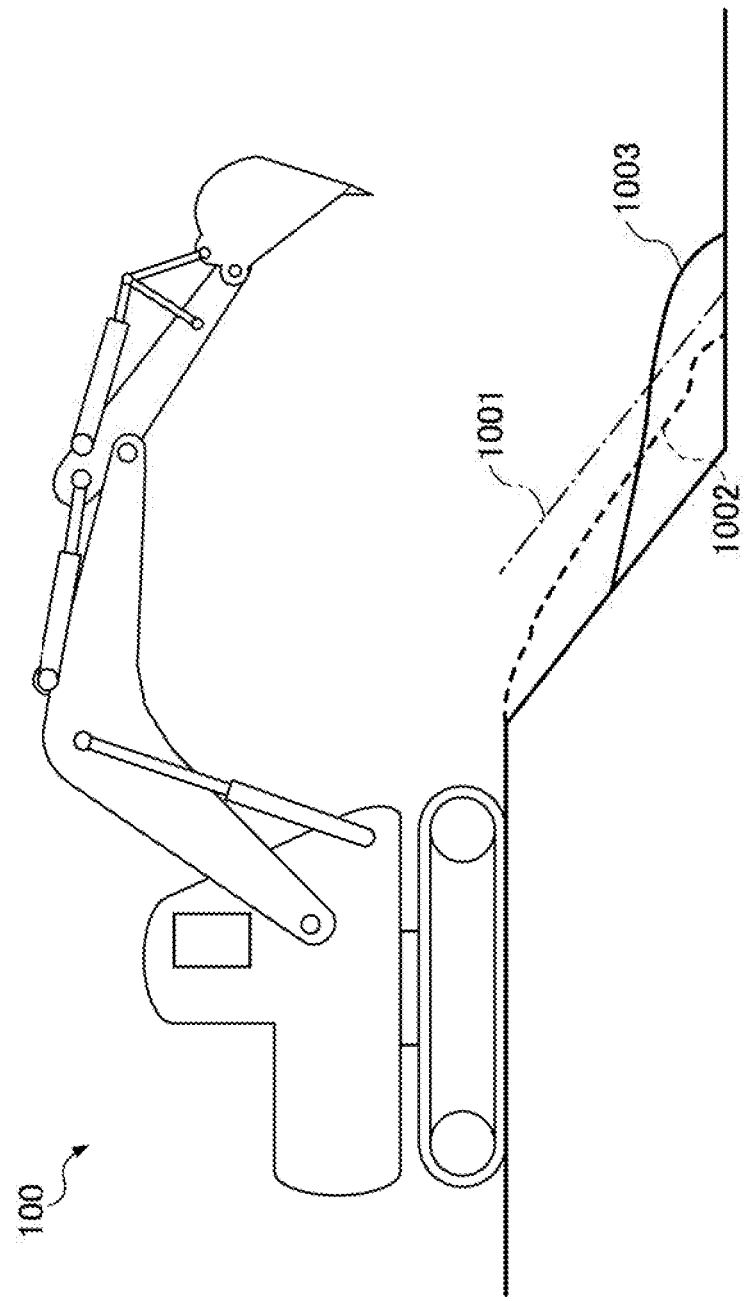

OPERATION SUPPORT SYSTEM FOR CONSTRUCTION MACHINE AND CONSTRUCTION MACHINE

RELATED APPLICATIONS

The present application is a continuation application filed under 35 U.S.C. 111(a) claiming benefit under 35 U.S.C. 120 and 365(c) of PCT International Application No. PCT/JP2019/014344 filed on Mar. 29, 2019, which is based on and claims the benefit of priority of Japanese Patent Application No. 2018-070359 filed on Mar. 30, 2018, the entire contents of which are incorporated herein by reference.

BACKGROUND

Technical Field

An aspect of this disclosure relates to an operation support system for a construction machine.

Description of Related Art

For example, there is a known operation support system that supports an operator of a construction machine by using high-quality operation data among past operation data of a work machine.

However, with a method where result data of high-quality operations among past result data is used, it is not possible to output support data with which the rating regarding a certain target index (for example, operation speed) can exceed past results. Therefore, there is room for improvement in terms of optimizing (maximizing) the rating regarding the target index.

SUMMARY

In an aspect of this disclosure, there is provided an operation support system for a construction machine. The operation support system includes a memory that stores a program and a processor configured to execute the program stored in the memory to perform a process. The process includes generating multiple operation patterns or multiple arrangement patterns for the construction machine such that a rating regarding a predetermined target index becomes relatively high, obtaining environmental information of the construction machine to be supported, and outputting, based on the multiple operation patterns or the multiple arrangement patterns, an operation pattern or an arrangement pattern with which the rating regarding the predetermined target index of an operation of the construction machine to be supported becomes relatively high under an environment corresponding to the obtained environmental information.

BRIEF DESCRIPTION OF THE DRAWINGS

FIG. 10 is a drawing for explaining effects of the operation support system.

DETAILED DESCRIPTION

An aspect of this disclosure makes it possible to provide an operation support system for a construction machine capable of outputting support data with a higher rating regarding a target index.

Embodiments of the present invention are described below with reference to the accompanying drawings.

[Outline of Operation Support System]

First, an outline of an operation support system SYS is described with reference to FIG. 1.

Figure 1:
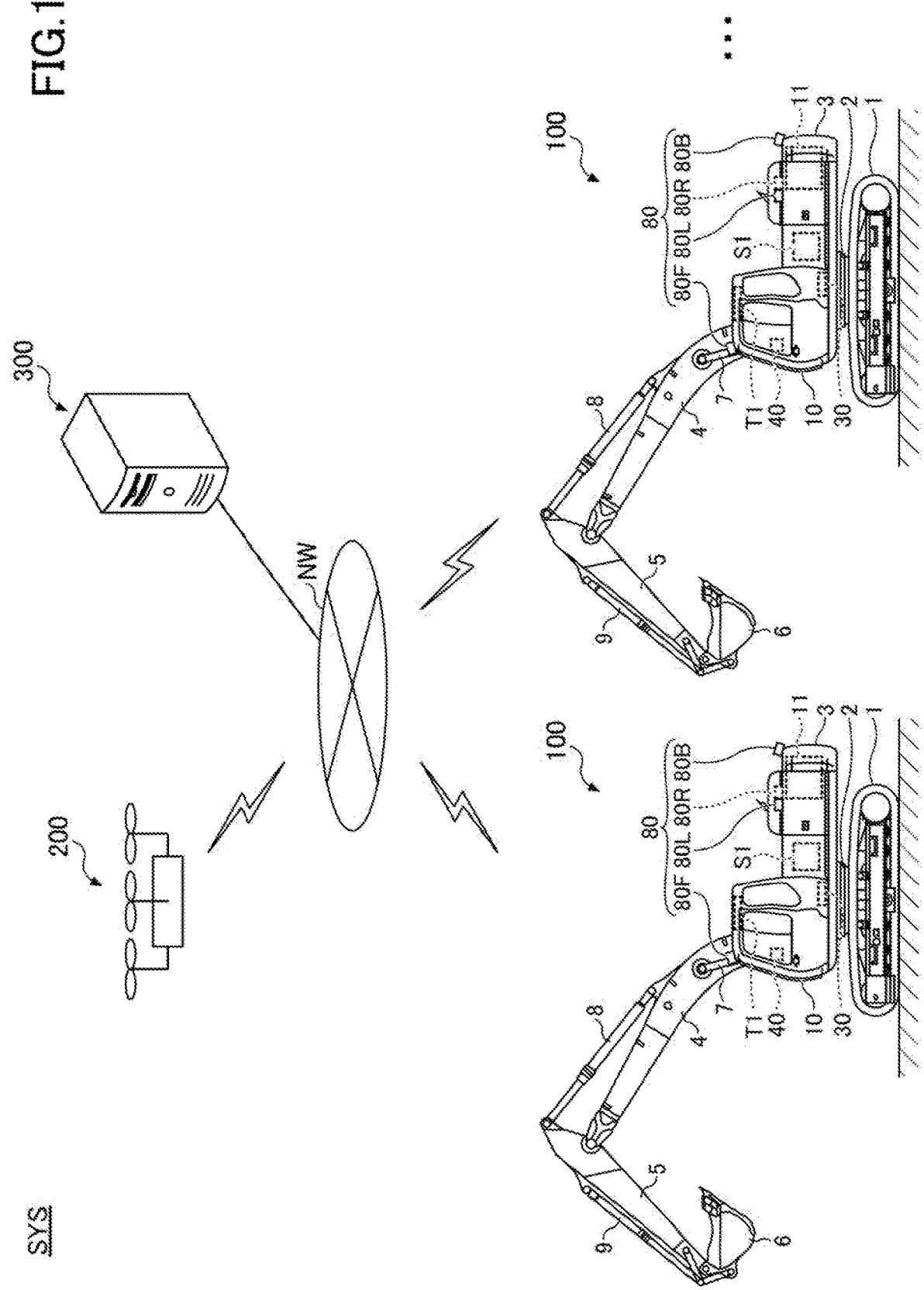
FIG. 1 is a drawing illustrating an example of an operation support system.

FIG. 1 is a drawing illustrating an example of the operation support system SYS.

The operation support system SYS includes multiple shovels 100, a flying body 200, and a management device 300.

The operation support system SYS collects result information related to operation patterns (which is hereafter referred to as "operation pattern result information") of predetermined types of operations (e.g., repetitive operations such as an excavation operation, a loading operation, and a compaction operation) and result information related to environmental conditions during the operations (which is hereafter referred to as "environmental condition result information") from the multiple shovels 100. An operation pattern indicates a pattern of a series of movements of the shovel 100 when performing a predetermined type of operation. For example, an operation pattern includes traces of movement of moving components such as a lower traveling body 1, an upper rotating body 3, a boom 4, an arm 5, and a bucket 6 during an operation. Specifically, operation pattern result information is, for example, detection information of various sensors indicating results of an operation pattern of the shovel 100 when the shovel 100 actually performs a predetermined type of operation. Environmental conditions may include external environmental conditions such as conditions related to the surrounding environment of the shovel 100, as well as internal environmental conditions such as variable specifications (for example, an arm length and a bucket type) of the shovel 100 that affect the movement of the shovel 100. The operation support system SYS performs machine learning based on the collected operation pattern result information and environmental condition result information to generate, for respective environmental conditions, operation patterns (optimum operation patterns) that are optimum for the shovel 100 to perform predetermined types of operations. An optimum operation pattern is an operation pattern generated so that the rating regarding a predetermined target index becomes relatively high. Examples of target indices include a high operation speed, a good fuel economy, a long lifetime of an attachment, a low frequency of occurrence of impact load, a large loading amount in a loading operation, and a slow growth of a crack in an attachment after the occurrence of the crack. Then, the operation support system SYS outputs an optimum operation pattern under the current environmental conditions of the shovel 100 to be supported based on the generated operation patterns and assists the operator so that the shovel 100 operates according to the optimum operation pattern.

The operation support system SYS may include other types of construction machines (e.g., an asphalt finisher and a bulldozer) in place of or in addition to the shovels 100. Also, the flying body 200 may be provided in each of multiple sites. That is, the operation support system SYS may include multiple flying bodies 200.

<Outline of Shovel>

The shovel 100 (an example of a construction machine) includes a lower traveling body 1, an upper rotating body 3 mounted on the lower traveling body 1 to be rotatable via a rotating mechanism 2, a boom 4, an arm 5, and a bucket 6 as attachments (work devices), and a cabin 10.

Figure 2:
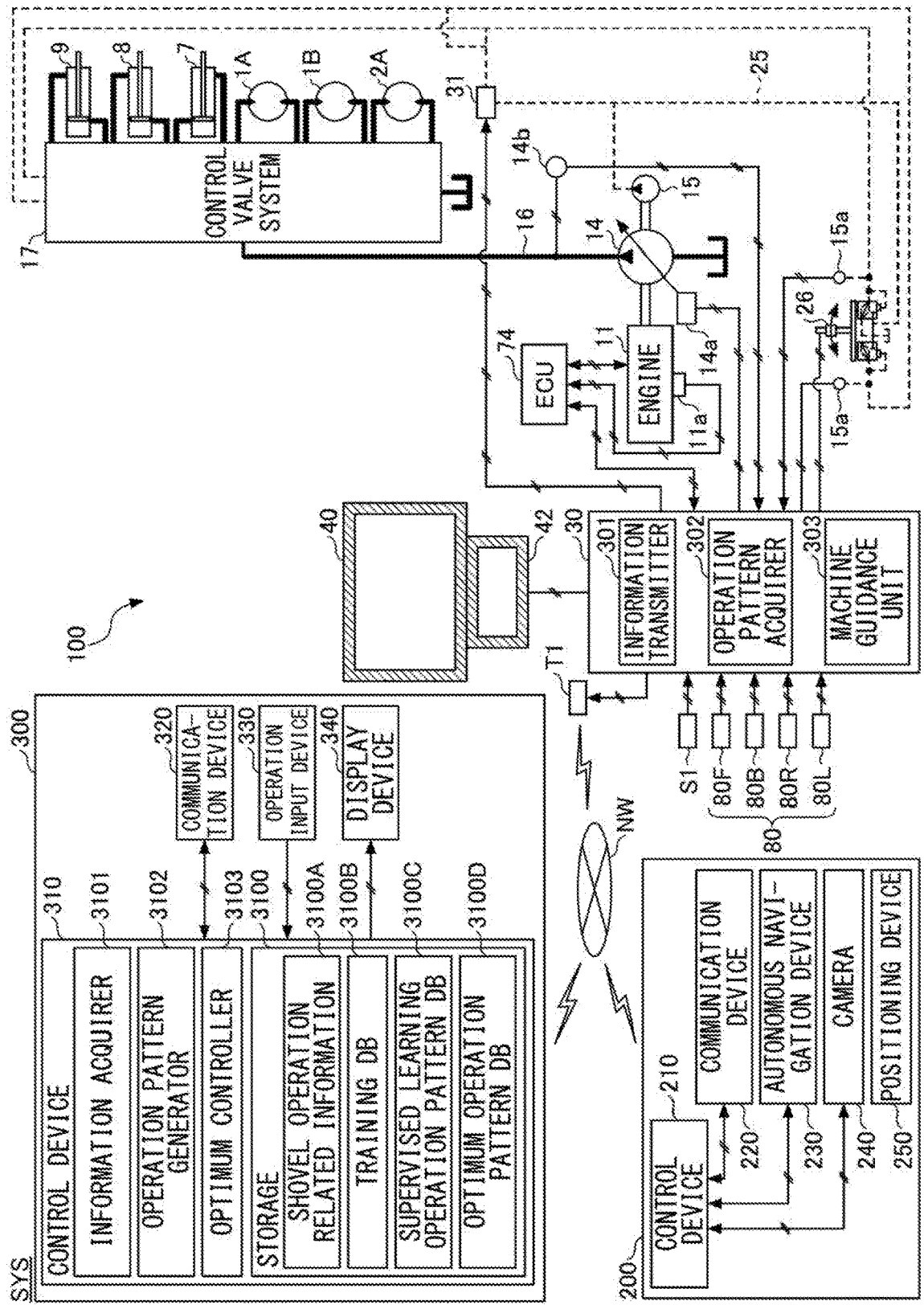
FIG. 2 is a drawing illustrating an example of a configuration of the operation support system.

The lower traveling body 1 includes, for example, a pair of right and left crawlers, and travels when the crawlers are hydraulically driven by traveling hydraulic motors 1A and 1B (see FIG. 2).

The upper rotating body 3 rotates with respect to the lower traveling body 1 by being driven by a rotation hydraulic motor 2A (see FIG. 2).

The boom 4 is mounted on the front center of the upper rotating body 3 such that the boom 4 is pivotable vertically, the arm 5 is attached to an end of the boom 4 such that the arm 5 can rotate vertically, and the bucket 6 is attached to an end of the arm 5 such that the bucket 6 can rotate vertically. The boom 4, the arm 5, and the bucket 6 are hydraulically-driven by a boom cylinder 7, an arm cylinder 8, and a bucket cylinder 9, respectively.

The cabin 10 is a cockpit for an operator, and is mounted on the front left side of the upper rotating body 3.

The shovel 100 can communicate with the management device 300 through a predetermined communication network NW such as a mobile communication network including a base station as a terminal, a satellite communication network using communication satellites in the sky, or the Internet. This enables the shovel 100 to send (upload) various types of information including the operation pattern result information and the environmental condition result information to the management device 300. Details are described later.

<Outline of Flying Body>

The flying body 200 flies over a work site where the shovel 100 operates. The flying body 200 may be configured to fly according to operation commands from a remote controller being held by the operator on the ground of the work site, or to fly automatically according to, for example, a predetermined flight route.

As described later, the flying body 200 includes a camera 240 and captures images of the work site (which are hereafter referred to as "work site images").

Also, the flying body 200 can communicate with the management device 300 via the communication network NW. This enables the flying body 200 to send (upload), for example, a work site image captured by the camera 240, information ("flying body orientation information") indicating the orientation of the flying body when the work site image is captured, and information ("flying body location information") indicating the position of the flying body when the work site image is captured. Details are described later.

<Outline of Management Device>

The management device 300 is a terminal device installed in a location that is geographically away from the shovel 100. The management device 300 is, for example, a server device installed in a management center provided outside of a work site where the shovel 100 operates, and is mainly composed of one or more server computers. In this case, the server device may be an in-house server run by a business operator managing the operation support system SYS or by a related business operator related to the business operator, or may be a so-called cloud server.

As described above, the management device 300 can communicate with each of the shovel 100 and the flying body 200 via the communication network NW. This enables the management device 300 to receive the operation pattern result information and the environmental condition result information uploaded from the shovel 100 and the work site image uploaded from the flying body 200, and to generate an optimum operation pattern for the shovel 100 to be supported based on the received information. Details are described later.

[Configuration of Operation Support System]

Next, a configuration of the operation support system SYS is described with reference to FIGS. 1 and 2.

FIG. 2 is a drawing illustrating an example of a configuration of the operation support system SYS.

In FIG. 2, a mechanical power line is indicated by a double line, a high-pressure hydraulic line is indicated by a thick solid line, a pilot line is indicated by a dotted line, and an electric drive-control line is indicated by a thin solid line.

<Configuration of Shovel>

A hydraulic drive system for hydraulically driving hydraulic actuators of the shovel 100 according to the present embodiment includes an engine 11, a main pump 14, a regulator 14a, and a control valve system 17. Also, as described above, the hydraulic drive system of the shovel 100 according to the present embodiment includes hydraulic actuators such as traveling hydraulic motors 1A and 1B, a rotation hydraulic motor 2A, a boom cylinder 7, an arm cylinder 8, and a bucket cylinder 9 that hydraulically drive the lower traveling body 1, the upper rotating body 3, the boom 4, the arm 5, and the bucket 6, respectively.

The engine 11 is the main power source in the hydraulic drive system, and is mounted on, for example, a rear part of the upper rotating body 3. Specifically, the engine 11 rotates constantly at a preset target rotation speed under the control of an engine control device (ECU: Engine Control Unit) 74 described later to drive the main pump 14 and the pilot pump 15. The engine 11 is, for example, a diesel engine fueled by light oil.

The regulator 14a controls the discharge rate of the main pump 14. For example, the regulator 14a adjusts the angle (tilt angle) of a swash plate of the main pump 14 according to a control command from the controller 30.

Similarly to the engine 11, the main pump 14 is mounted on, for example, a rear part of the upper rotating body 3, and supplies hydraulic oil to the control valve system 17 through a high-pressure hydraulic line 16. The main pump 14 is driven by the engine 11 as described above. The main pump 14 is, for example, a variable displacement hydraulic pump. As described above, the stroke length of the piston is adjusted by adjusting the tilt angle of the swash plate with the regulator 14a under the control of the controller 30, and the discharge flow rate (discharge pressure) of the main pump 14 is thereby controlled.

The control valve system 17 is, for example, a hydraulic control device that is provided in the middle of the upper rotating body 3 and controls the hydraulic drive system in response to an operation of an operating device 26 by the operator. As described above, the control valve system 17 is connected to the main pump 14 via the high-pressure hydraulic line 16 and supplies hydraulic oil supplied from the main pump 14 selectively to the hydraulic actuators (the traveling hydraulic motors 1A and 1B, the rotation hydraulic motor 2A, the boom cylinder 7, the arm cylinder 8, and the bucket cylinder 9) according to the operation state of the operating device 26. Specifically, the control valve system 17 includes multiple control valves that control the flow rates and the flow directions of the hydraulic oil supplied from the main pump 14 to the respective hydraulic actuators. For example, the control valve system 17 includes a control valve 175 that corresponds to the boom 4 (boom cylinder 7) (see FIG. 9). Also, for example, the control valve system 17 includes a control valve 176 corresponding to the arm 5 (arm cylinder 8) (see FIG. 9). Also, for example, the control valve system 17 includes control valve 174 corresponding to the bucket 6 (bucket cylinder 9) (see FIG. 9). Also, for example, the control valve system 17 includes a control valve 173 corresponding to the upper rotating body 3 (rotation hydraulic motor 2A) (see FIG. 9). Further, for example, the control valve system 17 includes a right traveling control valve and a left traveling control valve corresponding to the right crawler and the left crawler of the lower traveling body 1.

The operation system of the shovel 100 according to the present embodiment includes the pilot pump 15, the operating device 26, and an operation valve 31.

For example, the pilot pump 15 is provided in a rear part of the upper rotating body 3 and supplies a pilot pressure to the operating device 26 and the operation valve 31 via the pilot line 25. The pilot pump 15 is, for example, a fixed displacement hydraulic pump, and is driven by the engine 11 as described above.

The operating device 26 is provided near the cockpit of the cabin 10, and is an operation input unit used by the operator to operate various moving components (e.g., the lower traveling body 1, the upper rotating body 3, the boom 4, the arm 5, and the bucket 6). In other words, the operating device 26 is an operation input unit used by the operator to operate hydraulic actuators (e.g., the traveling hydraulic motors 1A and 1B, the rotation hydraulic motor 2A, the boom cylinder 7, the arm cylinder 8, and the bucket cylinder 9) for driving the moving components. Pilot lines on the secondary side of the operating device 26 are connected to the control valve system 17. With this configuration, pilot pressures corresponding to the operation states of the lower traveling body 1, the upper rotating body 3, the boom 4, the arm 5, and the bucket 6 by the operating device 26 are input to the control valve system 17. Therefore, the control valve system 17 can drive the hydraulic actuators according to the operation states of the operating device 26.

The operation valve 31 adjusts the flow path area of the pilot line 25 according to a control command (for example, a control current) from the controller 30. With this configuration, the operation valve 31 can output a pilot pressure corresponding to a control command to a secondary pilot line based on a primary pilot pressure supplied from the pilot pump 15. The secondary ports of the operation valve 31 are connected to the right and left pilot ports of each control valve of the control valve system 17 corresponding to a hydraulic actuator, and the operation valve 31 applies a pilot pressure corresponding to a control command from the controller 30 to the pilot ports of the control valve. With this configuration, even when the operating device 26 is not being operated by the operator, the controller 30 can drive a hydraulic actuator by supplying the hydraulic oil discharged from the pilot pump 15 via the operation valve 31 to the pilot ports of the corresponding control valve in the control valve system 17.

In addition to the operation valve 31, an electromagnetic relief valve may be provided to relieve an excess hydraulic pressure generated in the hydraulic actuator into a hydraulic oil tank. This makes it possible to actively suppress the operation of a hydraulic actuator when the amount of operation of the operating device 26 performed by the operator is excessive. For example, an electromagnetic relief valve may be provided to relieve the excess pressure in the bottom side oil chamber and the rod side oil chamber of each of the boom cylinder 7, the arm cylinder 8, and the bucket cylinder 9 into the hydraulic oil tank.

The control system of the shovel 100 of the present embodiment includes a controller 30, an ECU 74, a discharge pressure sensor 14b, an operation pressure sensor 15a, a display device 40, an input device 42, an imaging device 80, a state detection device S1, and a communication device T1.

The controller 30 performs drive control of the shovel 100. The functions of the controller 30 may be implemented by hardware, software, or a combination of them. For example, the controller 30 is mainly composed of a computer that includes a processor such as a central processing unit (CPU), a memory device such as a random access memory (RAM), a non-volatile secondary storage such as a read-only memory (ROM), and interfaces for various inputs and outputs. The controller 30 implements various functions by, for example, executing various programs installed in the secondary storage on the CPU. The same applies to the ECU 74, a control device 210 of the flying body 200, and a control device 310 of the management device 300 described later.

For example, the controller 30 sets a target rotation speed based on an operation mode preset according to a predetermined operation by the operator, and outputs a control command to the ECU 74 to control the engine 11, via the ECU 74, to rotate at a constant speed.

Also, for example, the controller 30 outputs a control command to the regulator 14a as needed to change the discharge amount of the main pump 14 and thereby perform a so-called total horsepower control or a negative control.

Also, for example, the controller 30 may include a function (upload function) to upload various types of information related to the shovel 100 to the management device 300. Specifically, the controller 30 may be configured to send (upload) operation pattern result information and environmental condition result information during a predetermined type of operation of the shovel 100 to the management device 300 via the communication device T1. The controller 30 includes an information transmitter 301 as a functional unit that is related to the uploading function and implemented by, for example, executing one or more programs installed in the secondary storage on the CPU.

Also, for example, the controller 30 controls the machine guidance function that guides the manual operation of the shovel 100 via the operating device 26 by the operator. The controller 30 may also control the machine control function that automatically assists the manual operation of the shovel 100 via the operating device 26 by the operator. The controller 30 includes an operation pattern acquirer 302 and a machine guidance unit 303 as functional units that are related to the machine guidance function and the machine control function and implemented by, for example, executing one or more programs installed in the secondary storage on the CPU.

A part of the functions of the controller 30 may be implemented by another controller (control device). That is, the functions of the controller 30 may be distributed to multiple controllers. For example, the machine guidance function and the machine control function described above may be implemented by dedicated controllers (control devices).

The ECU 74 controls various actuators (for example, a fuel injection device) of the engine 11 in response to a control command from the controller 30, and causes the engine 11 to rotate at a constant target rotation speed (set rotation speed) (constant rotation control). The ECU 74 performs the constant rotation control of the engine 11 based on the rotation speed of the engine 11 detected by an engine rotation speed sensor 11a.

The discharge pressure sensor 14b detects the discharge pressure of the main pump 14. The detection signal corresponding to the discharge pressure detected by the discharge pressure sensor 14b is input to the controller 30.

As described above, the operation pressure sensor 15a detects secondary pilot pressures at the operating device 26, that is, pilot pressures at the operating device 26 corresponding to the operation states of respective moving components (hydraulic actuators). Detection signals of pilot pressures at the operating device 26 corresponding to the operation states of, for example, the lower traveling body 1, the upper rotating body 3, the boom 4, the arm 5, and the bucket 6 detected by the operation pressure sensor 15a are input to the controller 30.

The display device 40 is connected to the controller 30, disposed in a position where the display device 40 is easily visible by the operator seated in the cabin 10, and displays various information images under the control of the controller 30. The display device 40 is, for example, a liquid crystal display or an organic EL (electroluminescence) display.

The input device 42 is provided within the reach of the operator seated in the cabin 10, receives various operations input by the operator, and outputs signals corresponding to the operations. For example, the input device 42 is integrated with the display device 40. Alternatively, the input device 42 may be provided separately from the display device 40. The input device 42 includes, for example, a touch panel mounted on a display of the display device 40, a knob switch provided at an end of a lever included in the operating device 26, a button switch, a lever, and a toggle disposed around the display device 40. The signals corresponding to the operations on the input device 42 are input to the controller 30.

The imaging device 80 captures images of scenes surrounding the shovel 100. The imaging device 80 includes a camera 80F capturing an image of the front side of the shovel 100, a camera 80L capturing an image of the left side of the shovel 100, a camera 80R capturing an image of the right side of the shovel 100, and a camera 80B capturing an image of the rear side of the shovel 100.

The camera 80F is attached to, for example, the ceiling of cabin 10, i.e., a part inside of the cabin 10. Also, the camera 80F may be attached to a part outside of the cabin 10 such as the roof of the cabin 10 or a side surface of the boom 4. The camera 80L is attached to the upper left edge of the upper rotating body 3, the camera 80R is attached to the upper right edge of the upper rotating body 3, and the camera 80B is attached to the upper rear edge of the upper rotating body 3.

The imaging device 80 (each of the cameras 80F, 80B, 80L, and 80R) is, for example, a monocular wide-angle camera having a very wide angle of view. Also, the imaging device 80 may be a stereo camera or a distance image camera. The images (which are hereafter referred to as "surrounding images") of scenes around the shovel 100 captured by the imaging device 80 are input to the controller 30.

The state detection device S1 outputs detection information related to various states of the shovel 100. The detection information output from the state detection device S1 is input to the controller 30.

For example, the state detection device S1 detects posture states and operation states of attachments. Specifically, the state detection device S1 may detect the depression/elevation angles of the boom 4, the arm 5, and the bucket 6 (which are hereafter referred to as a "boom angle", an "arm angle", and a "bucket angle", respectively). That is, the state detection device S1 may include a boom angle sensor S11, an arm angle sensor S12, and a bucket angle sensor S13 that detect the boom angle, the arm angle, and the bucket angle, respectively (see FIG. 9). The state detection device S1 may also detect the acceleration and the angular acceleration of each of the boom 4, the arm 5, and the bucket 6. In this case, the state detection device S1 may include, for example, a rotary encoder, an acceleration sensor, an angular acceleration sensor, a 6-axis sensor, and an inertial measurement unit (IMU) attached to each of the boom 4, the arm 5, and the bucket 6. Further, the state detection device S1 may include cylinder sensors each of which detects the cylinder position, the velocity, and the acceleration of one of the boom cylinder 7, the arm cylinder 8, and the bucket cylinder 9 that drive the boom 4, the arm 5, and the bucket 6, respectively.

Further, for example, the state detection device S1 detects the attitude states of bodies, i.e., the lower traveling body 1 and the upper rotating body 3. Specifically, the state detection device S1 may detect the inclined states of the bodies with respect to a horizontal plane. In this case, the state detection device S1 may include, for example, an inclination sensor that is attached to the upper rotating body 3 and detects inclination angles (which are hereafter referred to as a "longitudinal inclination angle" and a "lateral inclination angle") around two axes in the longitudinal direction and the lateral direction of the upper rotating body 3.

Also, for example, the state detection device S1 detects the rotating state of the upper rotating body 3. Specifically, the state detection device S1 detects the rotation angular velocity and the rotation angle of the upper rotating body 3. In this case, the state detection device S1 may include, for example, a gyro sensor, a resolver, and a rotary encoder attached to the upper rotating body 3. That is, the state detection device S1 may include a rotation angle sensor S15 that detects the rotation angle of the upper rotating body 3.

Also, for example, the state detection device S1 detects the state of force being applied to the shovel 100 via attachments. Specifically, the state detection device S1 may detect the working pressures (cylinder pressures) of hydraulic actuators. In this case, the state detection device S1 may include pressure sensors that detect pressures in the rod side oil chambers and the bottom side oil chambers of the boom cylinder 7, the arm cylinder 8, and the bucket cylinder 9.

Also, for example, the state detection device S1 may include sensors that detect displacements of spools of control valves in the control valve system 17. Specifically, the state detection device S1 may include a boom spool displacement sensor S16 that detects a displacement of a boom spool constituting a control valve 175. The state detection device S1 may also include an arm spool displacement sensor S17 that detects a displacement of an arm spool constituting a control valve 176. The state detection device S1 may also include a bucket spool displacement sensor S18 that detects a displacement of a bucket spool constituting a control valve 174. Also, the state detection device S1 may include a rotation spool displacement sensor S19 that detects a displacement of a rotation spool constituting a control valve 173. Further, the state detection device S1 may include a right traveling spool displacement sensor and a left traveling spool displacement sensor that detect displacements of a right traveling spool and a left traveling spool that constitute a right traveling control valve and a left traveling control valve, respectively.

Further, for example, the state detection device S1 detects the position of the shovel 100 and the orientation of the upper rotating body 3. In this case, the state detection device S1 may include, for example, a GNSS (Global Navigation Satellite System) compass, a GNSS sensor, and a direction sensor that are attached to the upper rotating body 3.

The communication device T1 communicates with an external device through the communication network NW. The communication device T1 is, for example, a mobile communication module that supports mobile communication standards such as the long term evolution (LTE), the 4th Generation (4G), and the 5th Generation (5G) or a satellite communication module for connecting to a satellite communication network. The same applies to the communication device 220 of the flying body 200.

The information transmitter 301 transmits operation pattern result information and environmental condition result information during a predetermined type of operation of the shovel 100 to the management device 300 via the communication device T1. The operation pattern result information transmitted by the information transmitter 301 includes, for example, various types of detection information input from the state detection device S1. Also, the environmental condition result information transmitted by the information transmitter 301 includes, for example, surrounding images of the shovel. 100 input from the imaging device 80. Also, the environmental condition result information transmitted by the information transmitter 301 may include information related to internal environmental conditions of the shovel 100 such as variable specifications including a large bucket specification, a long arm specification, and a quick coupling specification. For example, the information transmitter 301 continuously determines whether a predetermined target-type operation is being performed. When it is determined that the target-type operation is being performed, the information transmitter 301 records operation pattern result information (i.e., various types of detection information input from the state detection device S1) and environmental condition information (i.e., surrounding images of the shovel 100 input from the imaging device 80) during a period where the operation is performed in, for example, an internal memory in association with each other. Here, the information transmitter 301 may also store, in the internal memory, date and time information related to the start and end of the target-type operation and position information of the shovel 100 during the operation in association with the set of the operation pattern result information and the environmental condition result information. This enables the management device 300 to extract a work site image corresponding to the set of the operation pattern result information and the environmental condition result information sent from the shovel 100 from among work site images uploaded from the flying body 200. The date and time information may be obtained from, for example, a predetermined time measuring unit (for example, a real time clock (RTC)) inside of the controller 30. Then, the information transmitter 301 transmits the set of the recorded operation pattern result information and the recorded environmental condition result information to the management device 300 via the communication device T1 at a predetermined timing such as a timing when the shovel 100 is keyed off (stopped). Also, the information transmitter 301 may be configured to send the set of the recorded operation pattern result information and the recorded environmental condition result information to the management device 300 via the communication device T1 each time after the target-type operation is completed.

The environmental condition result information may include detection information detected by other sensors mounted on the shovel 100 in place of or in addition to the imaging device 80. For example, the shovel 100 may be equipped with other sensors such as a millimeter-wave radar and a LIDAR (Light Detecting and Ranging) device, and the environmental condition result information may include detection information of these distance sensors. The same applies to the current environmental condition information described later. The environmental condition result information may also include weather information. The weather information may include information detected by, for example, a raindrop detection sensor and an illuminance sensor that may be included in the state detection device S1. The information transmitter 301 may be configured to transmit only the operation pattern result information to the management device 300. In this case, the management device 300 can generate environmental condition result information corresponding to the operation pattern result information sent from the shovel 100 based on captured images captured by the flying body 200 flying over the work site of the shovel 100. Also, the information transmitter 301 may consecutively upload detection information detected by the state detection device S1 and surrounding images of the shovel 100 captured by the imaging device 80 to the management device 300 via the communication device T1. In this case, the management device 300 may extract information corresponding to a period when the target-type operation is performed from the information uploaded from the shovel 100, and generate operation pattern result information and environmental information.

When a predetermined type of operation is to be performed, the operation pattern acquirer 302 obtains, from the management device 300, an operation pattern (optimum operation pattern) that is optimum for the current environmental conditions related to a predetermined target index. For example, in response to a predetermined operation (which is hereafter referred to as an "acquisition request operation") performed by the operator on the input device 42, the operation pattern acquirer 302 sends a signal (acquisition request signal) requesting to obtain an operation pattern to the management device 300 via the communication device T1. The acquisition request signal includes information (which is hereafter referred to as "current environmental condition information") related to the current environmental conditions of the shovel 100. With this configuration, the management device 300 can provide, to the shovel 100, an optimum operation pattern that matches the current environmental conditions of the shovel 100. The current environmental condition information includes, for example, the latest surrounding images of the shovel 100 captured by the imaging device 80. The current environmental condition information may also include information related to internal environmental conditions of the shovel 100, such as variable specifications including a large bucket specification, a long arm specification, and a quick coupling specification. Also, the current environmental condition information may include information, i.e., weather information, detected by, for example, a raindrop detection sensor and an illuminance sensor that may be included in the state detection device S1. Then, the operation pattern acquirer 302 obtains information on an operation pattern that is transmitted from the management device 300 in response to the acquisition request signal and received by the communication device T1.

The operation pattern acquirer 302 may not necessarily send the current environmental condition information to the management device 300 together with the acquisition request signal. In this case, the management device 300 may determine the current environmental conditions (external environmental conditions) of the shovel 100 based on a work site image that corresponds to the work site of the shovel 100 and is uploaded from the flying body 200. Also, the management device 300 may obtain weather information as an environmental condition of the work site of the shovel 100 from, for example, a server or a website related to weather information based on flying body position information uploaded from the flying body 200.

The machine guidance unit 303 performs control processes related to the machine guidance function and the machine control function. That is, the machine guidance unit 303 assists the operator in operating various operating elements (the lower traveling body 1, the upper rotating body 3, and attachments including the boom 4, the arm 5, and the bucket 6) via the operating device 26.

For example, when the operator is operating the arm 5 via the operating device 26, the machine guidance unit 303 may automatically operate at least one of the boom 4 and the bucket 6 so that an end (e.g., the tip or the back side) of the bucket 6 matches a predetermined target design surface (which is hereafter simply referred to as a "design surface"). Also, the machine guidance unit 303 may automatically operate the arm 5 regardless of the operation state of the operating device 26 for operating the arm 5. That is, the machine guidance unit 303 may be triggered by the operation of the operating device 26 by the operator to cause an attachment to perform a predetermined operation.

More specifically, the machine guidance unit 303 acquires various types of information from the state detection device S1, the imaging device 80, the communication device T1, and the input device 42. Also, the machine guidance unit 303 calculates a distance between the bucket 6 and the design surface based on the obtained information. Then, the machine guidance unit 303 appropriately controls the operation valve 31 according to the calculated distance between the bucket 6 and the design surface, and individually and automatically adjusts the pilot pressures applied to the control valves corresponding to the hydraulic actuators to cause the hydraulic actuators to operate automatically. The operation valve 31 includes, for example, a boom proportional valve 31A corresponding to the boom 4 (the boom cylinder 7) (see FIG. 9). The operation valve 31 also includes, for example, an arm proportional valve 31B corresponding to the arm 5 (the arm cylinder 8) (see FIG. 9). The operation valve 31 also includes, for example, a bucket proportional valve 31C corresponding to the bucket 6 (the bucket cylinder 9) (see FIG. 9). The operation valve 31 also includes, for example, a rotation proportional valve 31D corresponding to the upper rotating body 3 (the rotation hydraulic motor 2A) (see FIG. 9). Further, the operation valve 31 includes, for example, a right traveling proportional valve and a left traveling proportional valve corresponding to the right-side crawler and the left-side crawler of the lower traveling body 1.

For example, the machine guidance unit 303 may automatically expand and contract at least one of the boom cylinder 7, the arm cylinder 8, and the bucket cylinder 9 in response to the opening and closing operations of the arm 5 with the operating device 26 to assist an excavation operation. The excavation operation is an operation of excavating the ground with the tip of the bucket 6 along the design surface. The machine guidance unit 303 automatically expands and contracts at least one of the boom cylinder 7 and the bucket cylinder 9 when, for example, the operator is manually operating the operating device 26 to operate the arm 5 in the closing direction (which is hereafter referred to as an "arm closing operation").

Also, the machine guidance unit 303 may automatically expand and contract at least one of the boom cylinder 7, the arm cylinder 8, and the bucket cylinder 9 to assist a finishing operation (compaction operation) on a slope or a horizontal surface. The compaction operation is an operation of pulling the bucket 6 along the design surface while pressing the back side of the bucket 6 against the ground. The machine guidance unit 303 automatically expands and contracts at least one of the boom cylinder 7 and the bucket cylinder 9 when, for example, the operator is manually operating the operating device 26 to perform the arm closing operation. This makes it possible to move the bucket 6 along the design surface, which is a finished slope or horizontal surface, while pressing the back side of the bucket 6 against an unfinished slope or horizontal surface with a predetermined pressing force.

The machine guidance unit 303 may also automatically rotate the rotation hydraulic motor 2A to cause the upper rotating body 3 to face the design surface. In this case, the machine guidance unit 303 may cause the upper rotating body 3 to face the design surface in response to an operation of a predetermined switch included in the input device 42. Also, the machine guidance unit 303 may cause the upper rotating body 3 to face the design surface and start the machine control function in response to a simple operation of a predetermined switch.

Further, for example, when a predetermined type of operation (for example, an excavation operation, a loading operation, or a compaction operation) is being performed, the machine guidance unit 303 controls at least a part of operations of attachments, the upper rotating body 3, and the lower traveling body 1 to match the operation pattern (optimum operation pattern) obtained by the operation pattern acquirer 302 in response to an operation of the operating device 26 by the operator. With this configuration, the operator can make the operation of the shovel 100 match an operation pattern that is optimum for the current environmental conditions of the shovel 100 and output from the management device 300 (an optimum controller 3103 described later) so that the rating of a predetermined target index such as the operation speed becomes relatively high regardless of the proficiency of the operator in maneuvering the shovel 100.

Further, the machine guidance unit 303 may display the movement of the shovel 100 corresponding to the optimum operation pattern on the display device 40 for the operator while controlling the movement of the shovel 100 based on the optimum operation pattern. For example, when controlling the movement of the shovel 100 based on the optimum operation pattern, the machine guidance unit 303 displays, on the display device 40, a video of a simulation result of a simulator 3102D corresponding to the optimal operation pattern. This enables the operator to perform an operation while confirming the actual operation pattern with a video displayed on the display device 40.

<Configuration of Flying Body>

The flying body 200 is an autonomous flying body that can be flown by remote control or autopilot and may be, for example, a multicopter or an airship. In the present embodiment, as illustrated in FIG. 1, the flying body 200 is a quadcopter.

The flying body 200 includes a control device 210, a communication device 220, an autonomous navigation device 230, a camera 240, and a positioning device 250.

The control device 210 performs various controls related to the flying body 200.

For example, the control device 210 transmits work site images consecutively input from the camera 240 to the management device 300 via the communication device 220. Also, the control device 210 may be configured to send a work site image input from the communication device 220 via and the camera 240 to the management device 300 when a work site image transmission request is received from the management device 300. Further, the control device 210 may be configured to send work site images buffered for a certain period of time at once via the communication device 220 to the management device 300 at a predetermined timing. Also, the control device 210 may be configured to transmit work site images to the management device 300 together with position information and date and time information corresponding to the respective work site images. In this case, the date and time information may be obtained from, for example, a predetermined time measuring unit (for example, an RTC) inside of the control device 210.

The communication device 220 communicates with an external device via the communication network NW. Specifically, the communication device 220 communicates with the management device 300 under the control of the control device 210. The communication device 220 is connected to the control device 210, and various types of information received from the outside are input to the control device 210.

The autonomous navigation device 230 is a device for realizing autonomous navigation of the flying body 200. The autonomous navigation device 230 includes, for example, a flight control device, an electric motor, and a battery. Also, the flying body 200 may be equipped with a GNSS receiver in order to independently determine the position of the flying body 200. Also, when an external power source on the ground is used via a wired connection instead of a battery, the flying body 200 may include a converter that performs voltage conversion. Further, the flying body 200 may include a solar panel. The flight control device includes various sensors such as a gyro sensor, an acceleration sensor, a barometric pressure sensor, and an ultrasonic sensor, and provides an attitude maintenance function and an altitude maintenance function. The electric motor receives power from the battery and rotates the propellers. When receiving information related to a target flight position from, for example, the control device 210, the autonomous navigation device 230 controls the rotation speeds of the four propellers separately, and causes the flying body 200 to move to the target flight position while maintaining the attitude and the altitude of the flying body 200. The information related to the target flight position includes, for example, the latitude, longitude, and altitude of the target flight position. The control device 210 acquires the information on the target flight position from the outside via the communication device 220. The autonomous navigation device 230 may change the orientation of the flying body 200 when receiving information on a target orientation from the control device 210.

The camera 240 captures images of scenes of a work site below the flight area of the flying body 200. The camera 240 may be attached to, for example, the lower surface of the flying body 200 to be able to capture images of scenes vertically below the flying body 200. The images (work site images) captured by the camera 240 are input to the control device 210.

The positioning device 250 detects the position and the orientation of the flying body 200. For example, the positioning device 250 may include a GNSS compass, a GNSS sensor, and a direction sensor (geomagnetic sensor). The information detected by the positioning device 250 is input to the control device 210.

The positioning device 250 may be built in the autonomous navigation device 230 (flight control device).

<Configuration of Management Device>

The management device 300 includes a control device 310, a communication device 320, an operation input device 330, and a display device 340.

The control device 310 performs various controls in the management device 300.

For example, the control device 310 performs machine learning (supervised learning and reinforcement learning) based on the collected operation pattern result information and environmental condition result information and thereby controls a function (which is hereafter referred to as a "machine learning function") for generating an operation pattern (optimum operation patterns) that is optimum for a predetermined type of operation performed by the shovel 100 for each of multiple environmental conditions. Also, the control device 310 controls a function (which is hereafter referred to as an "operation support function") that outputs the optimum operation pattern under the current environmental condition of the shovel 100 to be supported based on the generated operation patterns.

The control device 310 includes an information acquirer 3101, an operation pattern generator 3102, and an optimum controller 3103 as functional units that are related to the machine learning function and the operation support function and are implemented by executing one or more programs installed in the secondary storage on the CPU. The control device 310 also includes a storage 3100 as a storage area that is related to the machine learning function and the operation support function and defined in a non-volatile storage device in the control device 310. Details of the configuration of the management device 300 related to the machine learning function and the operation support function are described later (see FIG. 3).

The storage 3100 may instead be provided outside of the control device 310.

The communication device 320 communicates via the communication network NW with external devices such as the shovel 100 and the flying body 200. The communication device 320 is connected to the control device 310, and various types of information received from the outside are input to the control device 310.

The operation input device 330 receives operations input by, for example, the operator or the administrator of the management device 300, and outputs signals corresponding to the input operations. The operation input device 330 is connected to the control device 310, and the signals corresponding to the input operations are input to the control device 310.

The display device 340 is, for example, a liquid crystal display or an organic EL display and displays various information images under the control of the control device 310.

[Examples of Machine Learning Function and Operation Support Function]

Next, examples of the machine learning function and the operation support function in the operation support system SYS are described with reference to FIG. 3 and FIG. 4.

Figure 3:
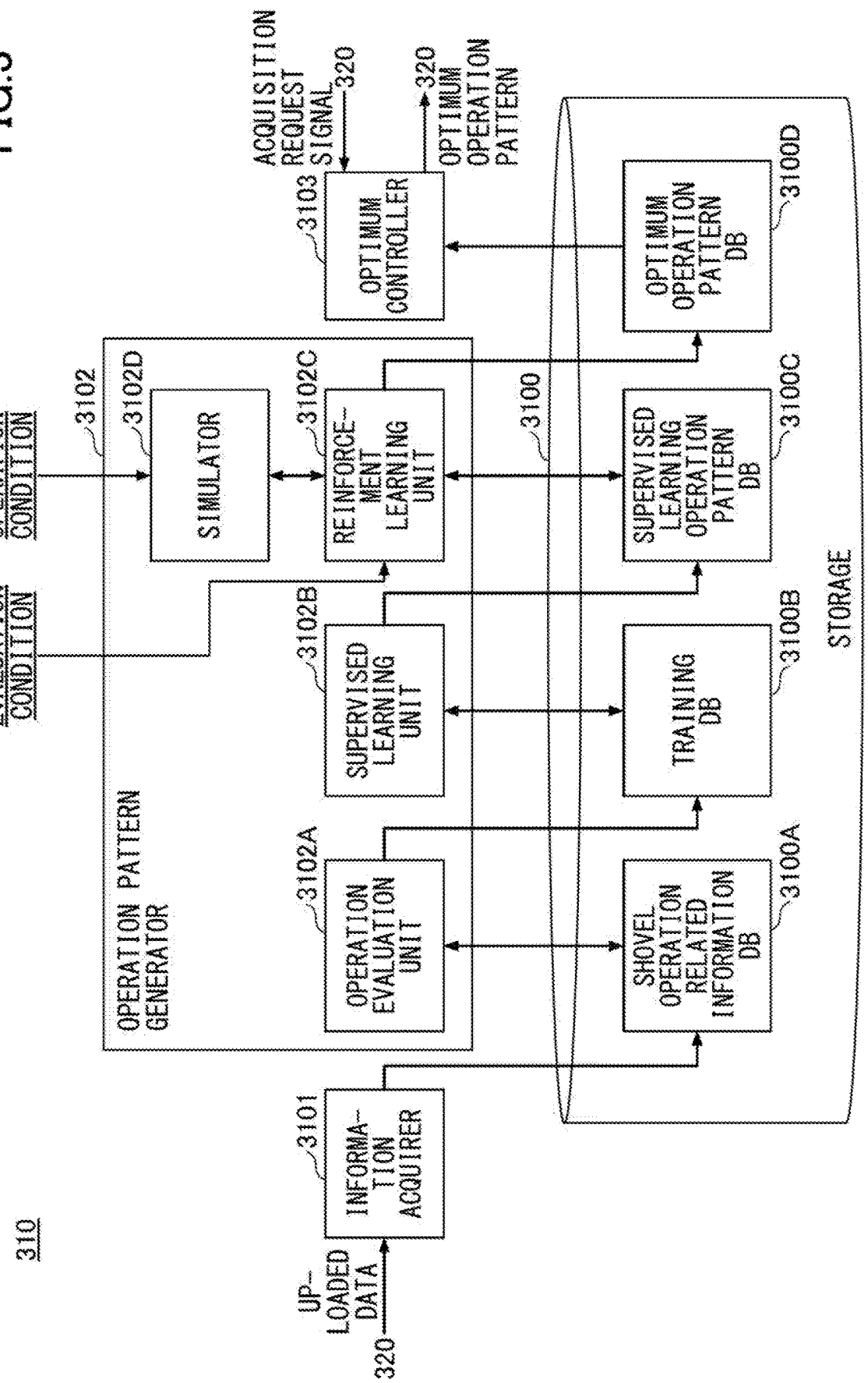
FIG. 3 is a block diagram illustrating an example of a functional configuration related to a machine learning function and an operation support function of the operation support system.

FIG. 3 is a block diagram illustrating an example of a functional configuration related to the machine learning function and the operation support function in the operation support system SYS. Specifically, FIG. 3 is a block diagram illustrating an example of a functional configuration of the machine learning function and the operation support function in the management device 300 (the control device 310).

The information acquirer 3101 (an example of a result information acquisition unit) obtains uploaded data such as operation pattern result information and environmental condition result information from one or more shovels 100 and work site images from one or more flying bodies 200. Then, the information acquirer 3101 stores the operation pattern result information, the environmental condition result information, and the work site images in a shovel operation related information data base (DB) 3100A in the storage 3100 to enable data extraction such that these information items are organized for each operation of the of shovel 100 and each operation type. The information acquirer 3101 may be configured to extract, from the work site images, only work site images obtained at a date and time near the date and time of the operation pattern result information and the environmental condition result information uploaded from the shovel 100 at the corresponding work site, and incorporate the extracted work site images in the environmental condition result information. Also, the information acquirer 3101 may be configured to access a server or a website related to weather information via the communication device 320, obtain weather information at the same date and time as the operation pattern result information and the environmental condition information uploaded from the shovel 100, and incorporate the weather information in the environmental condition result information. Hereafter, the set of operation pattern result information and environmental condition result information stored in the shovel operation related information DB 3100A for each operation is referred to as "shovel operation related information" for descriptive purposes.

Based on the operation pattern result information and the environmental condition result information for each operation stored in the shovel operation related information DB 3100A, the operation pattern generator 3102 (an example of a generator) generates an optimum operation pattern having a relatively high rating regarding the target index for each target operation type and for each target index, i.e., an optimum operation pattern with the maximized rating for each of different environmental conditions.

The operation pattern generator 3102 includes an operation evaluation unit 3102A, a supervised learning unit 3102B, a reinforcement learning unit 3102C, and a simulator 3102D.

The operation evaluation unit 3102A extracts, for each target index, shovel operation related information with a relatively high rating regarding the target index, specifically, with a rating greater than or equal to a predetermined standard, from sets of shovel operation related information stored in the shovel operation related information DB 3100A for respective operations. Specifically, feature values related to the rating are defined for each target index, and the operation evaluation unit 3102A extracts the feature values from the shovel operation related information and evaluates the shovel operation related information based on the extracted feature values. For example, when the target index is the operation speed in the loading operation, the feature values may include a rotation speed, a loading amount, an excavation path (depth, position, and length), an angle in the middle of excavation, a boom raising position, and a bucket path (during lifting rotation, lowering rotation, soil removing, and suspension movement), an engine speed, and a pump horsepower. Also, when the lifetime of an attachment in the excavation operation is the target index, the feature values may include an insertion angle of the tip of the bucket 6 and the magnitude of an excavation force. The operation evaluation unit 3102A stores the extracted shovel operation related information as training data for supervised learning in the training DB 3100B in which data is organized for respective operation types and target indices for data extraction.

The supervised learning unit 3102B performs known machine learning (supervised learning) for each work type and each target index based on the training data stored in the training DB 3100B, and generates an operation pattern ("supervised learning operation pattern") with a relatively-high rating regarding the target index for each of multiple different environmental conditions. In this process, a function of the operation evaluation unit 3102A may be used to determine the rating regarding the target index. The same applies to the reinforcement learning unit 3102C. The generated supervised learning operation patterns are stored in the supervised learning operation pattern DB 3100C in which data is organized so as to be extractable for each environmental condition.

The reinforcement learning unit 3102C performs reinforcement learning for each operation type and each target index based on a predetermined evaluation condition and the supervised learning operation patterns stored in the supervised learning operation pattern DB 3100C for the different environmental conditions. Then, the reinforcement learning unit 3102C generates an operation pattern (optimum operation pattern) with a higher target index for each of the different environmental conditions. Specifically, the reinforcement learning unit 3102C causes the simulator 3102D to repeatedly perform the simulation of a target-type operation, autonomously selects operation patterns with higher rewards, i.e., with higher ratings related to the target index, and finally generates an optimum operation pattern under a certain environmental condition. Also, the reinforcement learning unit 3102C can generate an optimum operation pattern under an environmental condition that is not included in the supervised learning operation patterns by using the simulator 3102D. The generated optimum operation patterns are stored in the optimum operation pattern DB 3100D in which data is organized for respective operation types and environmental conditions for data extraction.

The simulator 3102D can perform, for each operation type, a simulation of movements included in an operation pattern of the shovel 100 based on input conditions such as environmental conditions, operation conditions, and the operation pattern. With this configuration, the simulator 3102D can generate operation patterns. Therefore, the reinforcement learning unit 3102C can perform not only reinforcement learning based on the past operation patterns (operation pattern result information) obtained by the information acquirer 3101, but also reinforcement learning based on information on operation patterns newly generated by the simulator 3102D.

Figure 4:
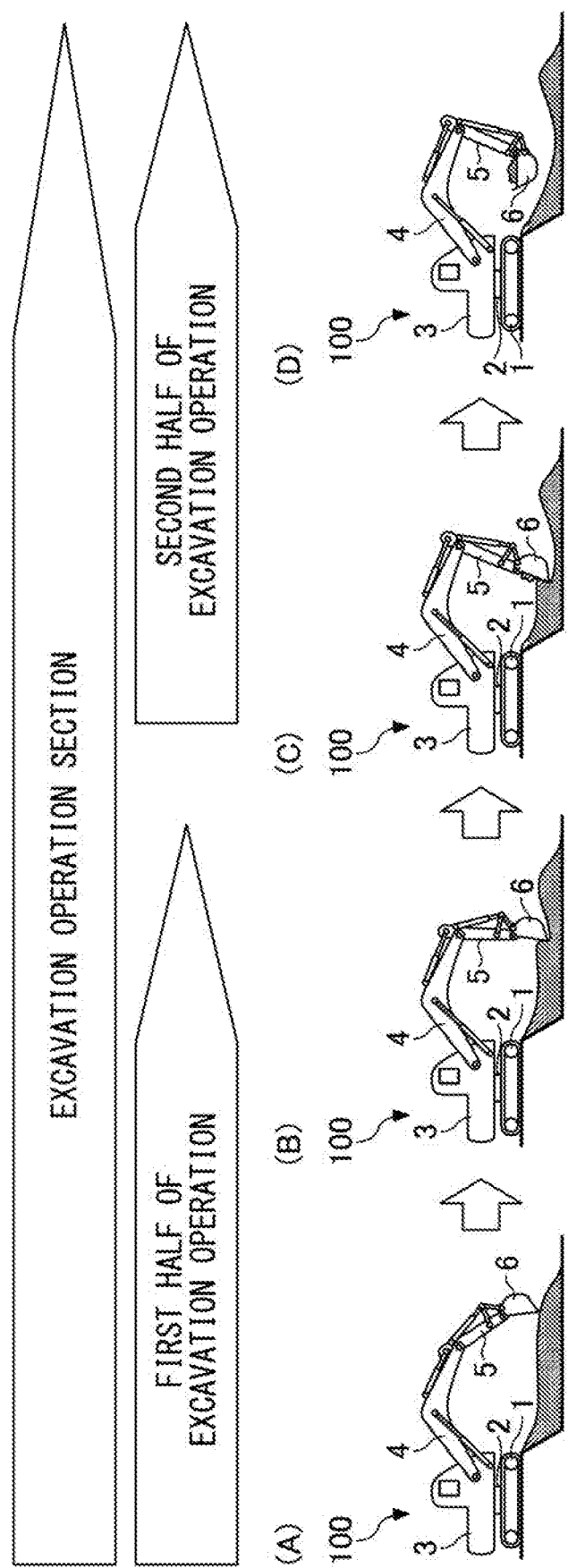
FIG. 4 is a drawing for explaining an example of an operation simulation of a shovel related to an operation pattern performed by a simulator.

For example, FIG. 4 is a drawing illustrating an example of an operation simulation of the shovel 100 in an excavation operation by the simulator 3102D.

As illustrated in FIG. 4 (A) through FIG. 4 (D), in the operation simulation in the excavation operation, the simulator 3102D simulates, based on input conditions, a series of movements where the shovel 100 places the bucket 6 on the ground and causes the bucket 6 to hold a load such as soil by pulling the bucket 6.

In this case, the simulator 3102D performs simulations by generating multiple operation setting conditions by changing operation settings such as the tip angle (an insertion angle and an angle in the middle of excavation) of the bucket 6, an excavation path (depth, position, and length), a boom raising position, an engine speed, and a pump horsepower. As a result, the simulator 3102D obtains feature values and target indices for the respective operation setting conditions. In this way, the simulator 3102D can generate virtual operation pattern information (which is hereafter referred to as "operation pattern virtual information"). Then, the simulator 3102D inputs the operation pattern virtual information to the reinforcement learning unit 3102C, and the reinforcement learning unit 3102C can obtain an optimum operation pattern.

Although the present embodiment includes a case where operation pattern result information from the information acquirer 3101 is used, the operation pattern result information is not necessarily used. That is, the operation pattern generator 3102 may obtain an optimum operation pattern based only on the operation pattern virtual information generated by the simulator 3102D.

In response to an acquisition request signal received from the shovel 100 via the communication device 320, the optimum controller 3103 (an example of an environmental information acquisition unit and an output unit) outputs an optimum operation pattern with which a target index for a type of operation specified by the acquisition request signal becomes relatively high (maximized) under the current environmental condition of the shovel 100. The target index may be specified in advance or may be specified by the acquisition request signal sent from the shovel 100. Specifically, the optimum controller 3103 outputs an optimum operation pattern under the current environmental condition of the shovel 100 based on optimum operation patterns for multiple different environmental conditions stored in the optimum operation pattern DB 3100D.

For example, the optimum controller 3103 extracts, from the optimum operation pattern DB 3100D, an optimum operation pattern that matches the current environmental condition of the shovel 100 (specifically, the environmental condition corresponding to current environmental condition information included in the acquisition request signal), and outputs the optimum operation pattern. Also, when the optimum operation pattern DB 3100D does not include an optimum operation pattern that matches the current environmental condition of the shovel 100, the optimum controller 3103 may extract one or more optimum operation patterns corresponding to an environmental condition that is relatively close to the current environmental condition of the shovel 100. The optimum controller 3103 may be configured to apply a correction to the extracted one or more optimum operation patterns based on a difference between the environmental condition corresponding to the extracted optimum operation patterns and the current environmental condition of the shovel 100 and thereby output an optimum operation pattern corresponding to the current environmental condition of the shovel 100.

Also, for example, the optimum controller 3103 may be configured to autonomously output a unique optimum operation pattern that maximizes the target index under the current environment of the shovel 100 based on multiple optimum operation patterns stored in the optimum operation pattern DB 3100D by using the simulator 3102D according to a method (algorithm) similar to that of the reinforcement learning unit 3102C. In other words, the optimum controller 3103 may be comprised mainly of an artificial intelligence (AI) that autonomously outputs an optimum operation pattern, which maximizes the target index under the current environment of the shovel 100, based on multiple optimum operation patterns stored in the optimum operation pattern DB 3100D by using the simulator 3102D. With this configuration, the optimum controller 3103 can output an optimum operation pattern with a higher rating regarding the target index without using a method such as correction even when the optimum operation pattern DB 3100D does not include an optimum operation pattern corresponding to the current environment of the shovel 100.

The optimum controller 3103 sends the output optimum operation pattern via the communication device 320 to the shovel 100 that has sent the acquisition request signal.

Also, the optimum controller 3103 feeds back or adds the output optimum operation pattern to the optimum operation pattern DB 3100D and thereby updates the optimum operation pattern DB 3100D. As a result, for example, an operation pattern corresponding to a new environmental condition may be added to the optimum operation pattern DB 3100D, or an operation pattern in the optimum operation pattern DB 3100D may be updated to an operation pattern with a higher rating regarding the target index. Accordingly, the optimum controller 3103 becomes able to output an optimum operation pattern with a higher rating regarding the target index as the optimum operation pattern DB 3100D is updated.

The series of operations of the operation pattern generator 3102 described above are also repeatedly performed as new information is obtained from, for example, the shovel 100 by the information acquirer 3101 and the shovel operation related information DB 3100A is updated. Therefore, the optimum operation pattern DB 3100D is also updated as a result of the series of operations of the operation pattern generator 3102. Accordingly, the optimum controller 3103 becomes able to output an optimum operation pattern with a higher rating regarding the target index as the optimum operation pattern DB 3100D is updated.

[Effects of Operation Support System]

Figure 5:
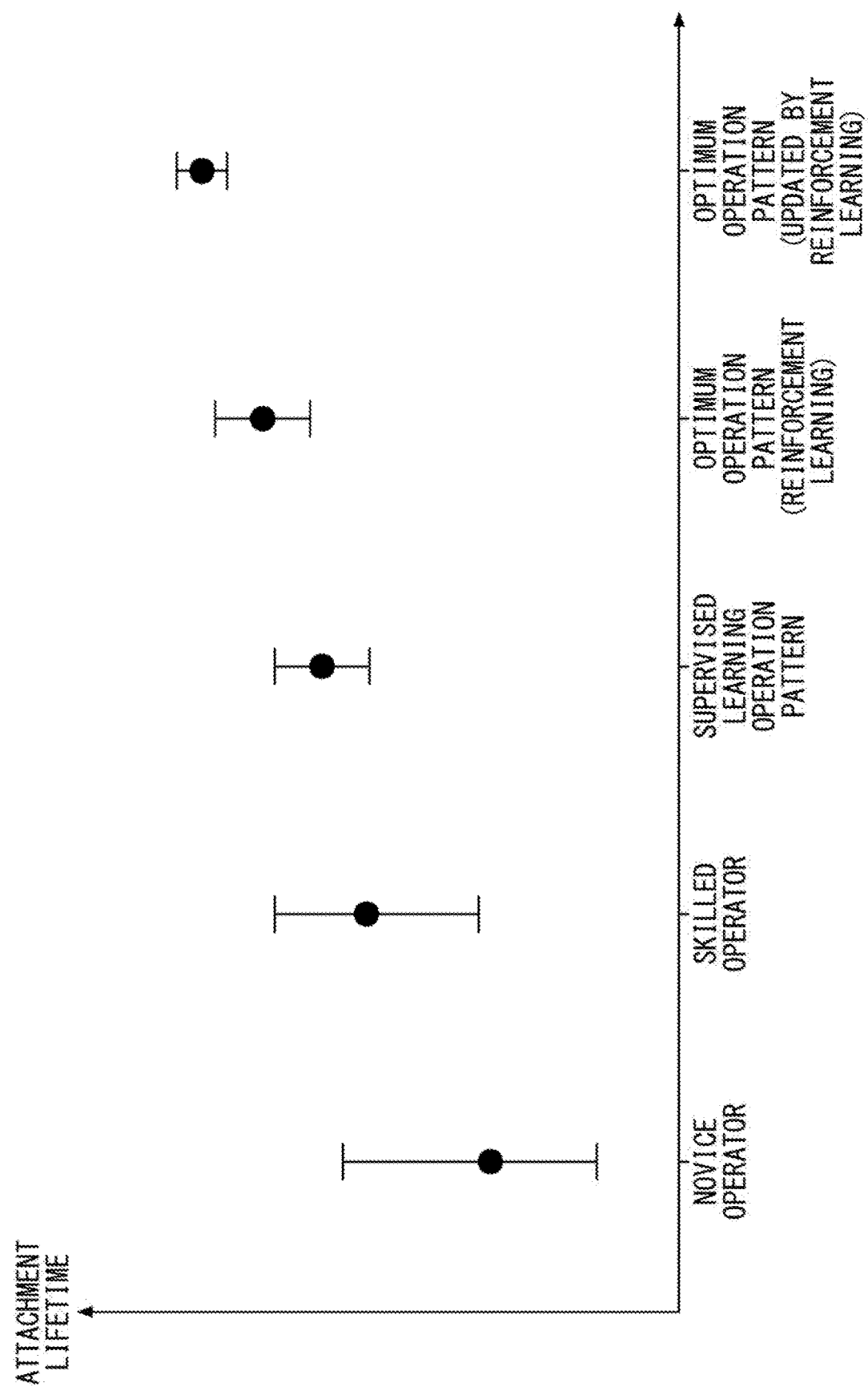
FIG. 5 is a drawing for explaining effects of the operation support system.

Next, with reference to FIG. 5, effects of the operation support system SYS (specifically, the operation support system SYS illustrated in FIG. 2 and FIG. 3) of the present embodiment are described.

FIG. 5 is a drawing for explaining the effects of the operation support system SYS. Specifically, FIG. 5 compares the lifetime of an attachment when the shovel 100 is operated by the machine control function using the optimum operation patterns output from the operation support system SYS (the management device 300) of the present embodiment with the lifetime of the attachment when the shovel 100 is manually operated by operators (a novice operator and a skilled operator).

In FIG. 5, the length of each vertical bar indicates a variation range, and each black dot indicates an average value.

As described above, the operation support system SYS (the management device 300) outputs an optimum operation pattern with a relatively high (maximized) rating regarding a target index under the current environmental condition of shovel 100 to support the operation of the shovel 100. For example, the operation support system SYS (the management device 300) outputs an optimum operation pattern for a loading operation performed by the shovel 100 by using a soil mound in an actual work site as the current environmental condition and an operation speed as the target index to cause the shovel 100 to perform a series of optimum operations including holding soil, rotating the upper rotating body 3, and removing the soil. Also, for example, for a shovel 100 where a crack is found in an attachment, the operation support system SYS may output an operation pattern that slows the crack growth to slow down the crack growth in the shovel 100. That is, the operation support system SYS (the management device 300) of the present embodiment can cause the shovel 100 to perform a given type of operation according to an operation pattern having a relatively high rating regarding a target index regardless of the operation skill level of the operator. Therefore, the operation support system SYS can improve the operation efficiency, the energy efficiency (fuel efficiency), and the durability of a shovel. Also, the operation support system SYS can assist the operator in an operation where, for example, an excavation operation, a loading operation, and a compaction operation are repeated. This in turn makes it possible to alleviate the fatigue of the operator. Also, when the slowness of the growth of a crack formed in an attachment of the shovel 100 is used as the target index, the operation support system SYS can slow down the growth of the crack as much as possible and buy time and can therefore prevent a situation where actual work at a work site is stopped in order to assess the state of the crack and repair the crack.

Specifically, as illustrated in FIG. 5, when, for example, the target index is the lifetime of an attachment, the lifetime of the attachment is short and varies widely in the case of a novice operator.

In the case of a skilled operator, the lifetime of the attachment is longer than that in the case of the novice operator, and the variation of the lifetime is smaller than that in the case of the novice operator. However, due to manual operations, a certain degree of variation may still occur.

When the shovel 100 is operated by the machine control function using a supervised learning operation pattern, the average lifetime of the attachment increases and the variation becomes considerably small. However, because training data is based on past records, the lifetime cannot exceed the maximum lifetime in the case of the skilled operator.

On the other hand, when the shovel 100 is operated by the machine control function using an optimum operation pattern output by the operation support system SYS (the management device 300) of the present embodiment, both of the average value and the maximum value of the lifetime of the attachment become greater than those achieved in the case where the supervised learning operation pattern is used.

As described above, the operation support system SYS (the management device 300) updates the optimum operation pattern DB 3100D. Accordingly, as illustrated in FIG. 5, when the shovel 100 is operated by the machine control function using an optimum operation pattern based on the updated optimum operation pattern DB, the average lifetime of the attachment can be further increased and the variation can be further reduced compared with the case before the update.

[Other Examples of Machine Learning Function and Operation Support Function]

Next, other examples of a machine learning function and an operation support function in the operation support system SYS are described with reference to FIG. 6 and FIG. 7.

Figure 6:
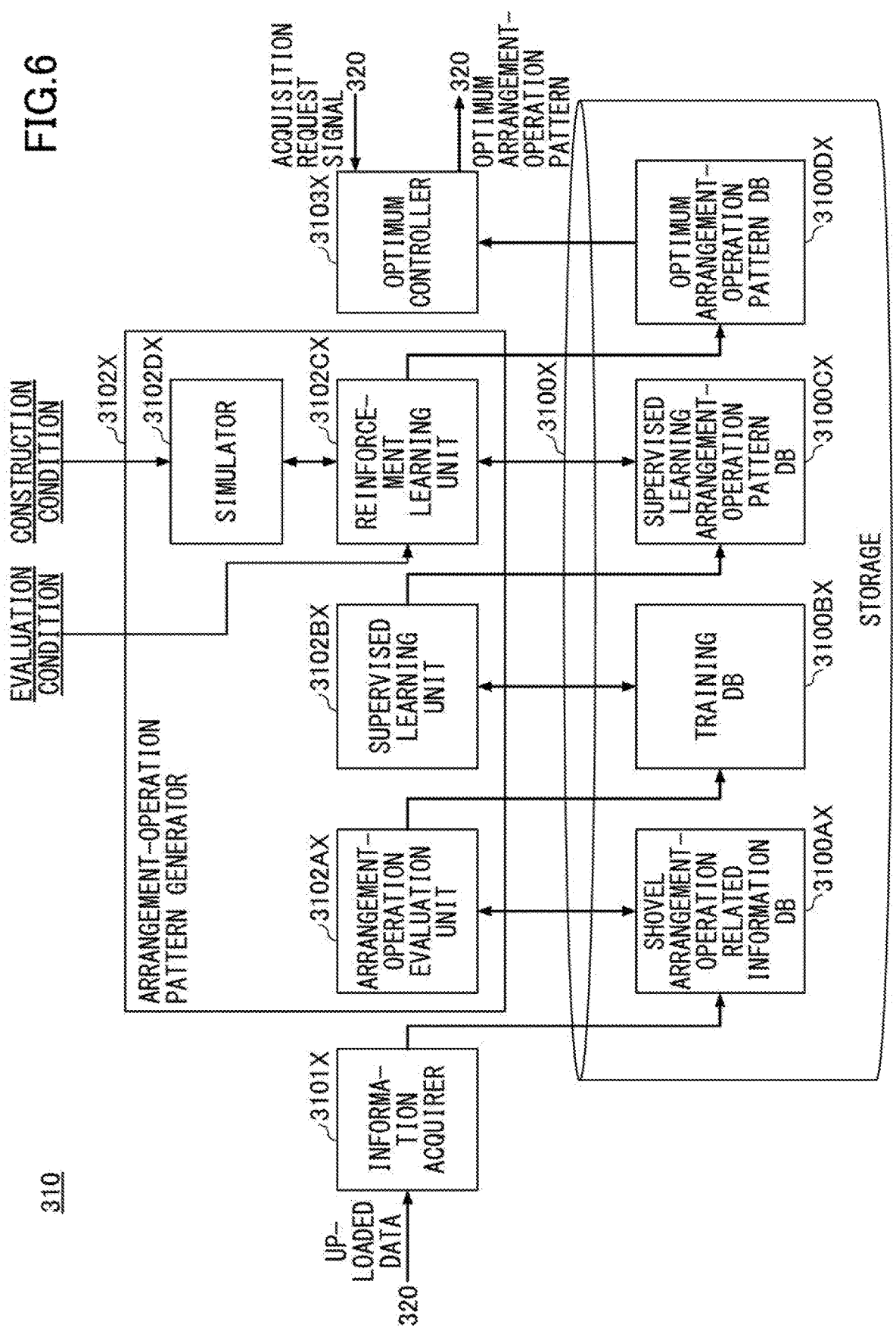
FIG. 6 is a block diagram illustrating another example of a functional configuration related to the machine learning function and the operation support function of the operation support system.

FIG. 6 is a block diagram illustrating another example of a functional configuration related to the machine learning function and the operation support function in the operation support system SYS. Specifically, FIG. 6 is a block diagram illustrating another example of a functional configuration related to the machine learning function and the operation support function in the management device 300 (the control device 310).

In this example, the management device 300 (the control device 310) generates an optimum arrangement pattern in addition to an optimum operation pattern. Here, an "arrangement" indicates a combination of operation contents (operation patterns), and an "operation content" indicates a combination of movement patterns. Specifically, an "arrangement" is a combination of operation patterns determined taking into account, for example, a construction order (an excavation position, an excavation amount, a temporary yard position, a temporary placement amount, a slope position, etc.), a turning position of a dump truck, the number of turns made by a dump truck, the number of dump trucks, the number of construction machines (e.g., shovels), a soil property, and presence/absence and positions of buried objects at a construction site. That is, the management device 300 (the control device 310) generates an optimum arrangement pattern and optimum operation patterns corresponding to respective operation patterns included in the optimum arrangement pattern. Hereafter, the "arrangement pattern" and the "operation pattern" are collectively referred to as an "arrangement-operation pattern". Also, in this example, the arrangement pattern and the optimum arrangement pattern are mainly described, and repeated descriptions of the operation pattern and the optimum operation pattern may be omitted.

The control device 310 includes an information acquirer 3101X, an arrangement-operation pattern generator 3102X, and an optimum controller 3103X as functional units. Also, the control device 310 uses a storage 3100X. The storage 3100X includes a shovel arrangement-operation related information DB 3100AX, a training DB 3100BX, a supervised learning arrangement-operation pattern DB 3100CX, and an optimum arrangement-operation pattern DB 3100DX.

The information acquirer 3101X obtains uploaded data such as operation pattern result information and environmental condition result information from one or more shovels 100 and work site images from one or more flying bodies 200. Also, the information acquirer 3101X generates result information related to arrangements (which is hereafter referred to as "arrangement result information") from the obtained operation pattern result information. The information acquirer 3101X may obtain arrangement result information from one or more shovels 100. Then, the information acquirer 3101X stores (registers) the operation pattern information, the environmental condition result information, the arrangement result information, and the work site images in the shovel arrangement-operation related information DB constructed in the storage 3100X. The shovel arrangement-operation related information DB is organized such that data can be extracted for each arrangement constituted by a series of operation contents of the shovel 100 and for each (type of) combination of operation contents constituting the arrangement. The shovel arrangement-operation related information data base (DB) 3100AX in the storage 3100X stores the operation pattern result information, the environmental condition result information, and the work site images. Hereafter, a set of arrangement result information and environmental condition result information stored for each arrangement in the shovel arrangement-operation related information DB 3100AX is referred to as "shovel arrangement related information" for descriptive purposes.

Based on the shovel arrangement related information stored in the shovel arrangement-operation related information DB 3100AX, the arrangement-operation pattern generator 3102X generates an optimum arrangement pattern with a relatively-high rating regarding a target index for each (type of) combination of operation contents and for each target index, i.e., an optimum arrangement pattern with the maximized rating for each of different environmental conditions.

The arrangement-operation pattern generator 3102X includes an arrangement-operation evaluation unit 3102AX, a supervised learning unit 3102BX, a reinforcement learning unit 3102CX, and a simulator 3102DX.

The arrangement-operation evaluation unit 3102AX extracts, for each target index, shovel arrangement related information whose rating regarding the target index is relatively high or greater than or equal to a predetermined standard from sets of shovel arrangement related information stored in the shovel arrangement-operation related information DB 3100AX. Specifically, feature values related to the rating are defined for each target index, and the arrangement-operation evaluation unit 3102AX extracts the feature values from the shovel arrangement related information and evaluates the shovel arrangement related information based on the extracted feature values. For example, target indices related to an arrangement may include (shortness of) an operation time, (smallness of) the number of workers, (smallness of) the amount of necessary fuel, and (smallness of) the amount of $CO_2$ emission. Also, feature values related to an arrangement may include the number of excavations, the number of rotations, a rotation angle, the amount of soil for each excavation, and the amount of soil for each loading. The arrangement-operation evaluation unit 3102AX stores the extracted shovel arrangement related information in the training DB 3100BX as training data for supervised learning. In the training DB 3100BX, training data (shovel arrangement related information) is organized for each (type of) combination of operation contents and for each target index such that data is extractable.

The supervised learning unit 3102BX performs known machine learning (supervised learning) for each (type of) combination of operation contents and for each target index based on the training data stored in the training DB 3100BX. Then, the supervised learning unit 3102BX generates, as a result of the supervised learning, an arrangement pattern (which is hereafter referred to as a "supervised learning arrangement pattern") having a relatively high rating regarding the target index for each of multiple different environmental conditions. A function of the arrangement-operation evaluation unit 3102AX may be used to determine the rating regarding the target index. The same applies to the reinforcement learning unit 3102CX. The generated supervised learning arrangement patterns are stored in the supervised learning arrangement-operation pattern DB 3100CX in which data is organized for each environmental condition such that the data is extractable.

The reinforcement learning unit 3102CX performs reinforcement learning for each (type of) combination of operation contents and for each target index based on the supervised learning arrangement patterns stored in the supervised learning arrangement-operation pattern DB 3100CX for the different environmental conditions and generates an operation pattern (optimum operation pattern) with a higher target index for each of the different environmental conditions. Specifically, the reinforcement learning unit 3102CX causes the simulator 3102DX to repeatedly perform a simulation on an arrangement with a target combination, autonomously selects operation patterns with higher rewards, i.e., with higher ratings regarding the target index, and finally generates an optimum operation pattern under a certain environmental condition. Also, the reinforcement learning unit 3102CX can generate an optimum operation pattern under an environmental condition that is not included in the supervised learning arrangement patterns by using the simulator 3102DX. The generated optimum operation patterns are stored in the optimum arrangement-operation pattern DB 3100DX in which data is organized for each (type of) combination of operation contents and for each environmental condition such that the data is extractable.

The simulator 3102DX can perform an operation simulation related to an arrangement of the shovel 100 for each (type of) combination of operation contents based on input conditions such as environmental conditions, construction conditions, and the arrangement pattern. With this configuration, the simulator 3102DX can generate arrangement patterns. Therefore, the reinforcement learning unit 3102CX can perform not only reinforcement learning based on past arrangement patterns (arrangement result information) obtained by the information acquirer 3101X but also reinforcement learning based on information on arrangement patterns newly generated by the simulator 3102DX.

Figure 7:
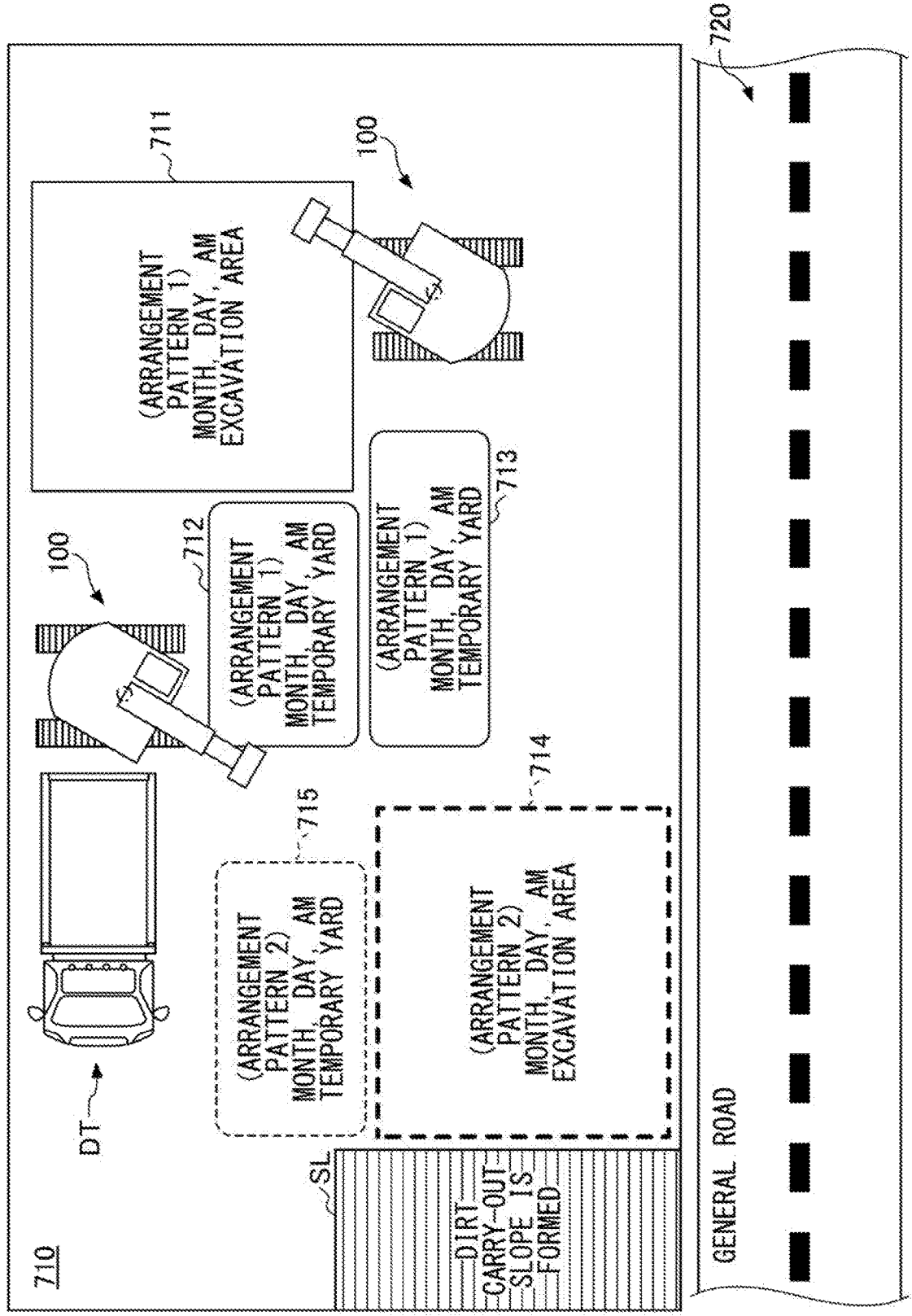
FIG. 7 is a drawing for explaining an example of an operation simulation related to an arrangement performed by a simulator.

For example, FIG. 7 is a drawing for explaining an example of an operation simulation of the shovel 100 regarding an arrangement of a construction site by the simulator 3102DX.

As illustrated in FIG. 7, in this example, a simulation related to an arrangement by the shovel 100 at a work site 710 along a general road 720 is performed.

In the work site 710, a slope SL for carrying out soil to the general road 720 is formed, and a dump truck DT enters the work site 710 to carry out soil. Also, an excavation area 711 is set in the work site 710, and temporary yards 712 and 713 for soil are set around the excavation area 711. Further, another excavation area 714 is set in the work site 710, and a temporary yard 715 for soil is set near the excavation area 714.

In this example, the simulator 3102DX simulates, under these construction conditions, an arrangement corresponding to a combination of an excavation operation on the excavation area 711, a soil removing operation for moving soil to the temporary yards 712 and 713, and a loading operation for loading the soil in the temporary yards 712 and 713 onto the dump truck DT. Also, under the same construction conditions, the simulator 3102DX simulates an arrangement corresponding to a combination of an excavation operation on the excavation area 714, a soil removing operation for moving soil to the temporary yard 715, and a loading operation for loading the soil in the temporary yard 715 onto the dump truck DT.

In this case, the simulator 3102DX generates, for example, multiple different operation setting conditions including the position, the orientation, the movement path, and the order of operations of the shovel 100 to perform the simulation. As a result, the simulator 3102DX obtains feature values and a target index for each operation setting condition. In this manner, the simulator 3102DX can generate virtual arrangement pattern information (which is hereafter referred to as "arrangement pattern virtual information"). Then, the simulator 3102DX inputs the arrangement pattern virtual information to the reinforcement learning unit 3102CX, and the reinforcement learning unit 3102CX can obtain an optimum arrangement pattern. When a simulation is performed, the position of the general road 720 is set as an unchangeable element, and the temporary yards 712 and 713 and the excavation area 714 are set as changeable elements.

The present embodiment includes an example in which arrangement pattern result information based on information acquired by the information acquirer 3101X is used. However, the arrangement pattern result information is not necessarily used. That is, the arrangement-operation pattern generator 3102X can also obtain an optimum arrangement pattern based only on arrangement pattern virtual information generated by the simulator 3102DX.

In response to an acquisition request signal received from the shovel 100 via the communication device 320, the optimum controller 3103X outputs an optimum arrangement pattern with which the target index becomes relatively high (or is maximized) under the current environmental condition of the shovel 100 for a combination of operation contents of a type specified by the acquisition request signal. The target index may be predetermined or may be specified by the acquisition request signal sent from the shovel 100. Specifically, the optimum controller 3103X outputs an optimum operation pattern under the current environmental condition of the shovel 100 based on optimum operation patterns stored in the optimum arrangement-operation pattern DB 3100DX for the different environmental conditions.

For example, the optimum controller 3103X extracts an optimum arrangement pattern that matches the current environmental condition of the shovel 100 (specifically, an environmental condition corresponding to current environmental condition information included in the acquisition request signal) from the optimum arrangement-operation pattern DB 3100DX and outputs the extracted optimum arrangement pattern. When the optimum arrangement pattern matching the current environmental condition of the shovel 100 is not included in the optimum arrangement-operation pattern DB 3100DX, the optimum controller 3103X may extract one or more optimum arrangement patterns corresponding to environmental conditions that are relatively close to the current environmental condition of the shovel 100. Then, the optimum controller 3103X may apply a predetermined correction to the extracted one or more optimum arrangement patterns based on differences between the environmental conditions corresponding to the extracted optimum arrangement patterns and the current environmental condition of the shovel 100 and thereby output an optimum arrangement pattern corresponding to the current environmental condition of the shovel 100.

Also, for example, the optimum controller 3103X may autonomously output a unique optimum arrangement pattern that maximizes the target index under the current environment of the shovel 100 based on multiple optimum arrangement patterns stored in the optimum arrangement-operation pattern DB 3100DX by using the simulator 3102DX according to a method (algorithm) similar to that of the reinforcement learning unit 3102CX. That is, the optimum controller 3103X may be comprised mainly of an artificial intelligence that autonomously outputs an optimum arrangement pattern that maximizes the target index under the current environment of the shovel 100 by using the simulator 3102DX based on multiple optimum arrangement patterns stored in the optimum arrangement-operation pattern DB 3100DX. With this configuration, the optimum controller 3103X can output an optimum arrangement pattern with a higher rating regarding the target index without using a method such as correction even when the optimum arrangement-operation pattern DB 3100DX does not include an optimum arrangement pattern corresponding to the current environment of the shovel 100.

The optimum controller 3103X sends the output optimum arrangement pattern via the communication device 320 to the shovel 100 that has sent the acquisition request signal.

In addition, the optimum controller 3103X feeds back or adds the output optimum arrangement pattern to the optimum arrangement-operation pattern DB 3100DX and thereby updates the optimum arrangement-operation pattern DB 3100DX. As a result, an operation pattern corresponding to a new environmental condition may be added to the optimum arrangement-operation pattern DB 3100DX and an operation pattern in the optimum arrangement-operation pattern DB 3100DX may updated to an operation pattern with a higher rating regarding the target index. Thus, the optimum controller 3103X can output an optimum arrangement pattern with a higher rating regarding the target index as the optimum arrangement-operation pattern DB 3100DX is updated.

Also, the series of operations of the arrangement-operation pattern generator 3102X are also repeatedly performed as new information is obtained by the information acquirer 3101X from, for example, the shovel 100 and the shovel arrangement-operation related information DB 3100AX is updated. Accordingly, the optimum arrangement-operation pattern DB 3100DX is also updated by the series of operations of the arrangement-operation pattern generator 3102X. Thus, the optimum controller 3103X can output an optimum arrangement pattern with a higher rating regarding the target index as the optimum arrangement-operation pattern DB 3100DX is updated.

[Still Other Examples of Machine Learning Function and Operation Support Function]

Figure 8:
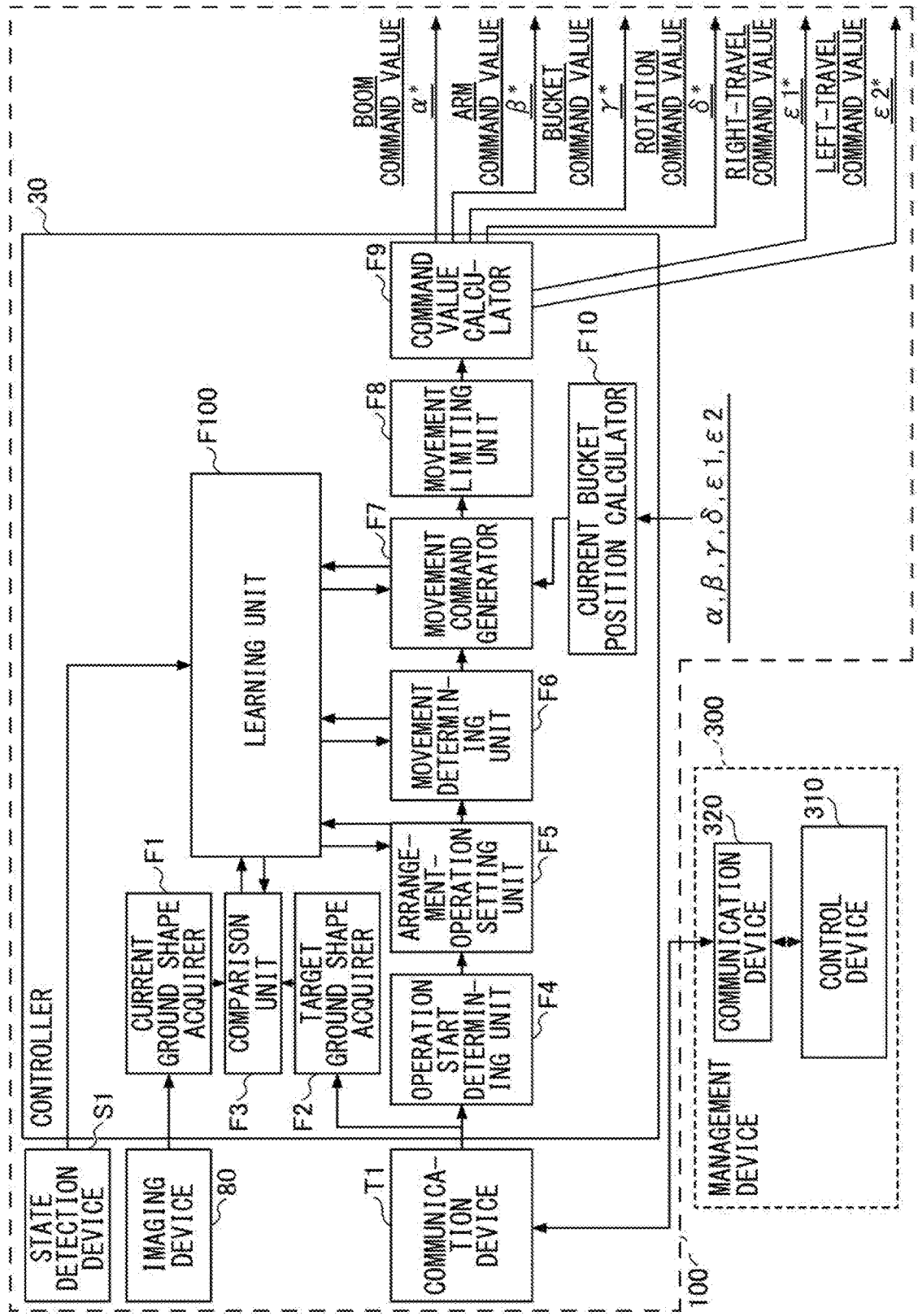
FIG. 8 is a block diagram illustrating another example of a functional configuration related to the machine learning function and the operation support function of the operation support system.
Figure 9:
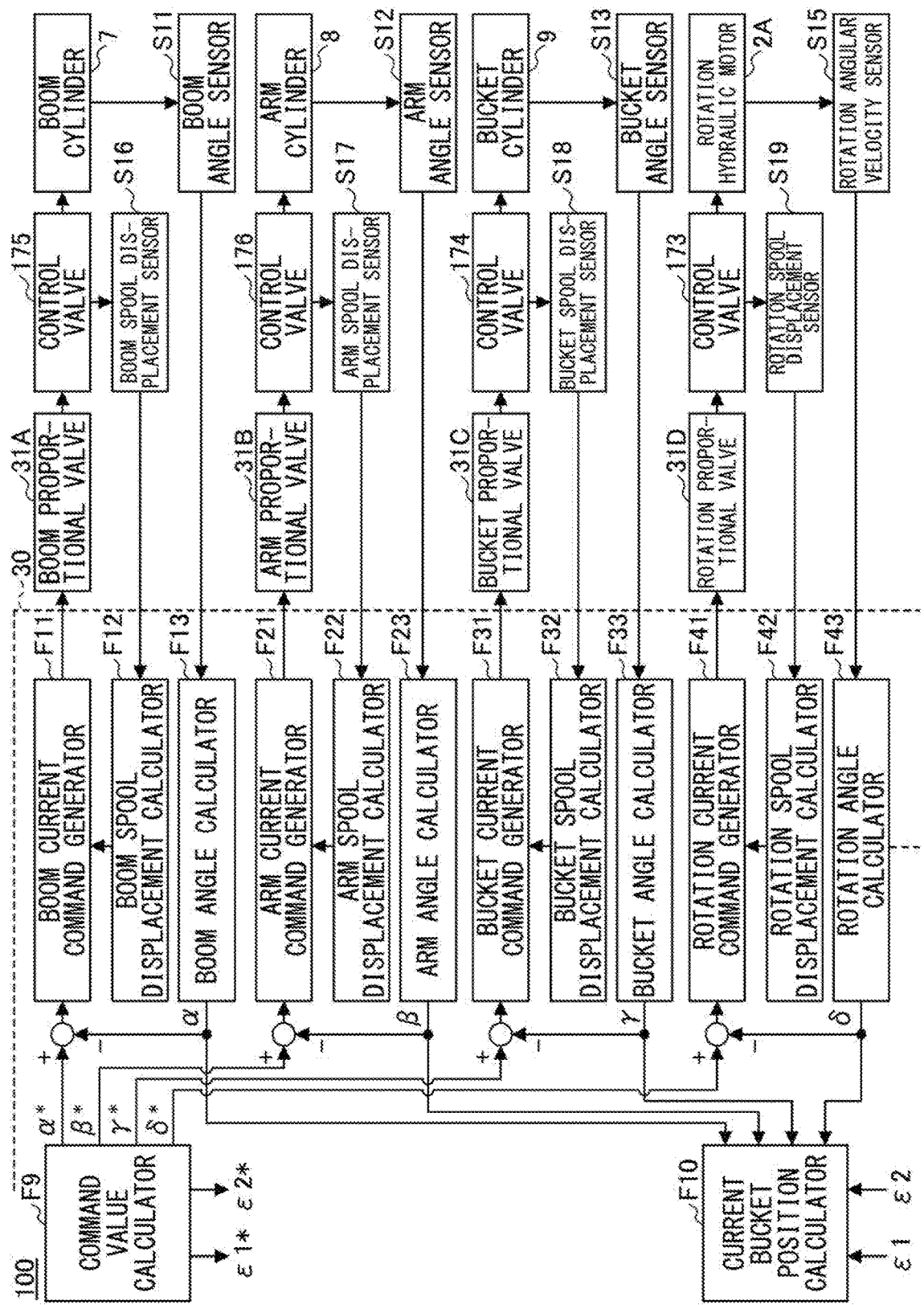
FIG. 9 is a block diagram illustrating still another example of a functional configuration related to the machine learning function and the operation support function of the operation support system.

Next, with reference to FIG. 8 and FIG. 9, still other examples of the machine learning function and the operation support function in the operation support system SYS are described.

FIG. 8 and FIG. 9 are block diagrams illustrating still other examples of functional configurations related to the machine learning function and the operation support function in the operation support system SYS. Specifically, FIG. 8 is a block diagram illustrating a configuration of the operation support system SYS according to this example, and FIG. 9 is a block diagram illustrating components of the shovel 100 in the configuration of the operation support system SYS that are not illustrated in FIG. 8.

In this example, the machine learning function and the operation support function are provided in the shovel 100. Below, components unique to this example are mainly described, and repeated descriptions may be omitted.

The controller 30 of the shovel 100 includes, as functional units implemented by executing one or more programs installed in the secondary storage on the CPU, a current ground shape acquirer F1, a target ground shape acquirer F2, a comparison unit F3, an operation start determining unit F4, an arrangement—operation setting unit F5, a movement determining unit F6, a movement command generator F7, a movement limiting unit F8, a command value calculator F9, a current bucket position calculator F10, a boom current command generator F11, a boom spool displacement calculator F12, a boom angle calculator F13, an arm current command generator F21, an arm spool displacement calculator F22, an arm angle calculator F23, a bucket current command generator F31, a bucket spool displacement calculator F32, a bucket angle calculator F33, a rotation current command generator F41, a rotation spool displacement calculator F42, and a rotation angle calculator F43.

The current ground shape acquirer F1 (an example of an environmental information acquisition unit) obtains information (e.g., three-dimensional data such as three-dimensional dots and surfaces) on a current ground shape ("current ground shape") around the shovel 100 based on images captured by the imaging device 80.

The target ground shape acquirer F2 obtains a ground shape (for example, a target construction surface) (which is hereafter referred to as a "target ground shape") that is to be formed in a construction site.

The comparison unit F3 compares the current ground shape with the target ground shape, and outputs information on a difference (hereafter, "difference information") between the current ground shape and the target ground shape to a learning unit F100.

The operation start determining unit F4 determines the start of an operation based on a command received from the management device 300 via the communication device T1.

The arrangement-operation setting unit F5 sets an arrangement in the work site and operations included in the arrangement according to a command received from the management device 300 via the communication device T1. The arrangement and the operations to be set are input to the learning unit F100 and the movement determining unit F6.

The movement determining unit F6 determines movements according to the arrangement and the operations set by the arrangement-operation setting unit F5 in response to a command from the learning unit F100. The determined movements are input to the learning unit F100 and the movement command generator F7.

The movement command generator F7 (an example of a controller) generates movement commands for the shovel 100, i.e., movement commands for actuators for driving driven components of the shovel 100 based on a command from the learning unit F100, the movements determined by the movement determining unit F6, and the current position (hereafter, "bucket current position") of a working part (e.g., the tip or the back side) of the bucket 6 calculated by the current bucket position calculator F10. The generated movement commands are input to the learning unit F100 and the movement limiting unit F8.

The movement limiting unit F8 limits the movements (including stopping the movements) of the shovel 100 corresponding to the movement commands generated by the movement command generator F7 according to predetermined movement limiting conditions. The movement limiting conditions may include, for example, "a possibility that a part other than the working part of the shovel 100 comes into contact with a surrounding object as a result of an movement of the shovel 100 corresponding to a movement command". Also, the movement limiting conditions may include, for example, "the angular velocity of the motion axis of an attachment exceeds an allowable range as a result of a movement of the shovel 100 corresponding to a movement command". Specifically, when a movement limiting condition is satisfied, the movement limiting unit F8 corrects the movement command generated by the movement command generator F7 such that the movement of the shovel 100 is restricted and outputs the corrected movement command to the command value calculator F9. On the other hand, when no movement limiting condition is satisfied, the movement limiting unit F8 outputs the movement command generated by the movement command generator F7 to the command value calculator F9 without change.

Based on movement commands or corrected movement commands input from the movement limiting unit F8, the command value calculator F9 outputs command values to the respective driven components (the boom 4, the arm 5, the bucket 6, the upper rotating body 3, and the right and left crawlers of the lower traveling body 1). Specifically, the command value calculator F9 outputs a boom command value $\alpha^*$ for the boom 4, an arm command value $\beta^*$ for the arm 5, a bucket command value $\gamma^*$ for the bucket 6, a rotation command value $\delta^*$ for the upper rotating body 3, a right-travel command value $\epsilon 1^*$ for the right crawler, and a left-travel command value $\epsilon 2^*$ for the left crawler.

The current bucket position calculator F10 calculates the current position (current bucket position) of the working part of the bucket 6. Specifically, the current bucket position calculator F10 calculates the current bucket position based on a boom angle $\alpha$, an arm angle $\beta$, a bucket angle $\gamma$, a right drive wheel rotation angle $\epsilon 1$, and a left drive wheel rotation angle $\epsilon 2$ that are fed back from the boom angle calculator F13, the arm angle calculator F23, the bucket angle calculator F33, and the rotation angle calculator F43.

The boom current command generator F11 outputs a boom current command to a boom proportional valve 31A.

The boom spool displacement calculator F12 calculates the amount of displacement of the boom spool constituting the control valve 175 corresponding to the boom cylinder 7 based on an output from the boom spool displacement sensor S16.

The boom angle calculator F13 calculates the boom angle $\alpha$ based on an output from the boom angle sensor S11.

The boom current command generator F11 basically generates a boom current command for the boom proportional valve 31A such that the difference between the boom command value $\alpha^*$ generated by the command value calculator F9 and the boom angle $\alpha$ calculated by the boom angle calculator F13 becomes zero. In this process, the boom current command generator F11 adjusts the boom current command such that the difference between a target boom spool displacement amount derived from the boom current command and a boom spool displacement amount calculated by the boom spool displacement calculator F12 becomes zero. Then, the boom current command generator F11 outputs the adjusted boom current command to the boom proportional valve 31A.

The boom proportional valve 31A changes the opening area according to the boom current command, and applies a pilot pressure corresponding to the magnitude of the boom command current to the pilot port of the control valve 175. The control valve 175 moves the boom spool according to the pilot pressure and causes hydraulic oil to flow into the boom cylinder 7. The boom spool displacement sensor S16 detects the displacement of the boom spool and feeds back the detection result to the boom spool displacement calculator F12 of the controller 30. The boom cylinder 7 expands and contracts in response to the inflow of the hydraulic oil and thereby moves the boom 4 up and down. The boom angle sensor S11 detects the rotation angle of the boom 4 moving up and down, and feeds back the detection result to the boom angle calculator F13 of the controller 30. The boom angle calculator F13 feeds back the calculated boom angle $\alpha$ to the current bucket position calculator F10.

The arm current command generator F21 outputs an arm current command to the arm proportional valve 31B.

The arm spool displacement calculator F22 calculates the amount of displacement of the arm spool constituting the control valve 176 corresponding to the arm cylinder 8 based on an output from the arm spool displacement sensor S17.

The arm angle calculator F23 calculates the arm angle β based on an output from the arm angle sensor S12.

The arm current command generator F21 basically generates an arm current command for the arm proportional valve 31B such that the difference between the arm command value β * generated by the command value calculator F9 and the arm angle β calculated by the arm angle calculator F23 becomes zero. In this process, the arm current command generator F21 adjusts the arm current command such that the difference between a target arm spool displacement amount derived from the arm current command and an arm spool displacement amount calculated by the arm spool displacement calculator F22 becomes zero. Then, the arm current command generator F21 outputs the adjusted arm current command to the arm proportional valve 31B.

The arm proportional valve 31B changes the opening area according to the arm current command, and applies a pilot pressure corresponding to the magnitude of the arm command current to the pilot port of the control valve 176. The control valve 176 moves the arm spool according to the pilot pressure and causes hydraulic oil to flow into the arm cylinder 8. The arm spool displacement sensor S17 detects the displacement of the arm spool and feeds back the detection result to the arm spool displacement calculator F22 of the controller 30. The arm cylinder 8 expands and contracts in response to the inflow of the hydraulic oil and thereby opens and closes the arm 5. The arm angle sensor S12 detects the rotation angle of the opening and closing arm 5, and feeds back the detection result to the arm angle calculator F23 of the controller 30. The arm angle calculator F23 feeds back the calculated arm angle β to the current bucket position calculator F10.

The bucket current command generator F31 outputs a bucket current command to the bucket proportional valve 31C.

The bucket spool displacement calculator F32 calculates the amount of displacement of the bucket spool constituting the control valve 174 corresponding to the bucket cylinder 9 based on the output from the bucket spool displacement sensor S18.

The bucket angle calculator F33 calculates the bucket angle γ based on an output from the bucket angle sensor S13.

The bucket current command generator F31 basically generates a bucket current command for the bucket proportional valve 31C such that the difference between the bucket command value γ * generated by the command value calculator F9 and the bucket angle γ calculated by the bucket angle calculator F33 becomes zero. In this process, the bucket current command generator F31 adjusts the bucket current command such that the difference between a target bucket spool displacement amount derived from the bucket current command and a bucket spool displacement amount calculated by the bucket spool displacement calculator F32 becomes zero. Then, the bucket current command generator F31 outputs the adjusted bucket current command to the bucket proportional valve 31C.

The bucket proportional valve 31C changes the opening area according to the bucket=rent command, and applies a pilot pressure corresponding to the magnitude of the bucket command current to the pilot port of the control valve 174. The control valve 174 moves the bucket spool according to the pilot pressure and causes hydraulic oil to flow into the bucket cylinder 9. The bucket spool displacement sensor S18 detects the displacement of the bucket spool and feeds back the detection result to the bucket spool displacement calculator F32 of the controller 30. The bucket cylinder 9 expands and contracts according to the inflow of the hydraulic oil and thereby opens and closes the bucket 6. The bucket angle sensor S13 detects the rotation angle of the opening and closing bucket 6, and feeds back the detection result to the bucket angle calculator F33 of the controller 30. The bucket angle calculator F33 feeds back the calculated bucket angle γ to the current bucket position calculator F10.

The rotation current command generator F41 outputs a rotation current command to the rotation proportional valve 31D.

The rotation spool displacement calculator F42 calculates the amount of displacement of the rotation spool constituting the control valve 173 corresponding to the rotation hydraulic motor 2A based on an output from the rotation spool displacement sensor S19.

The rotation angle calculator F43 calculates the rotation angle δ based on an output from the rotation angle sensor S15.

The rotation current command generator F41 basically generate a rotation current command for the rotation proportional valve 31D such that the difference between the rotation command value δ * generated by the command value calculator F9 and the rotation angle δ calculated by the rotation angle calculator F43 becomes zero. In this process, the rotation current command generator F41 adjusts the rotation current command such that the difference between a target rotation spool displacement amount derived from the rotation current command and a rotation spool displacement amount calculated by the rotation spool displacement calculator F42 becomes zero. Then, the rotation current command generator F41 outputs the adjusted rotation current command to the rotation proportional valve 31D.

The rotation proportional valve 31D changes the opening area according to the rotation current command, and applies a pilot pressure corresponding to the magnitude of the rotation command current to the pilot port of the control valve 173. The control valve 173 moves the rotation spool according to the pilot pressure, and causes hydraulic oil to flow into the rotation hydraulic motor 2A. The rotation spool displacement sensor S19 detects the displacement of the rotation spool and feeds back the detection result to the rotation spool displacement calculator F42 of the controller 30. The rotation hydraulic motor 2A rotates according to the inflow of the hydraulic oil and thereby causes the upper rotating body 3 to rotate. The rotation angle sensor S15 detects the rotation angle of the rotating upper rotating body 3 and feeds back the detection result to the rotation angle calculator F43 of the controller 30. The rotation angle calculator F43 feeds back the calculated rotation angle δ to the current bucket position calculator F10.

Each of the right crawler and the left crawler of the lower traveling body 1 also has a feedback loop similar to those of other driven components (operating bodies) such as the boom 4, the arm 5, the bucket 6, and the upper rotating body 3. That is, feedback loops are formed based on inputs of the right travel command value ε1* and the left travel command value ε2* generated by the command value calculator F9. The feedback loops feed back the right drive wheel rotation angle ε1 and the left drive wheel rotation angle ε2, which indicate the rotation positions (rotation angles) of the drive wheels of the right crawler and the left crawler, to the current bucket position calculator F10.

Thus, the controller 30 provides a three-stage feedback loop for each driven component (operating body). That is, the controller 30 forms feedback loops for spool displacement amounts, feedback loops for rotation angles of driven components (operating bodies), and a feedback loop for the position of the working part (e.g., the position of the tip) of the bucket 6. With this configuration, the controller 30 can accurately control the movement of the working part of the bucket 6 during automatic control.

The learning unit F100 (an example of a result information acquisition unit, a generator, and an output unit) implements a machine learning function and an operation support function. That is, the learning unit F100 includes functions similar to the information acquirer 3101X, the arrangement-operation pattern generator 3102X, and the optimum controller 3103X of the management device 300 (the control device 310) described above.

Specifically, unlike the management device 300 described above, the learning unit F100 causes the machine (the shovel 100) to perform actual operations and an actual arrangement and performs reinforcement learning based on result information obtained in the actual operations and the actual arrangement. The result information includes result information related to the arrangement, the operations, and the movements of the shovel 100 that is fed back from the arrangement-operation setting unit 55, the movement determining unit F6, and the movement command generator F7. The result information also includes result information related to environmental conditions such as current ground shape information around the shovel 100 that is input from the current ground shape acquirer F1 via the comparison unit F3. The result information further includes result information regarding the results of the arrangement, the operations, and the movements of the shovel 100 such as difference information from the comparison unit F3. With this configuration, the learning unit F100 can generate an operation pattern (optimum operation pattern) and an arrangement pattern (optimum arrangement pattern) with which the target index becomes relatively high for each operation type or each (type of) combination of operation contents and for each environmental condition based on the result information. Then, based on the difference information input from the comparison unit F3, the learning unit F100 outputs commands corresponding to the optimum operation pattern and the optimum arrangement pattern under the current environmental condition (i.e., the current ground shape) to the arrangement-operation setting unit F5, the movement determining unit F6, and the movement command generator F7. With this configuration, the controller 30 (the movement command generator F7) can automatically or semi-automatically control its own machine (the shovel 100) based on the optimum operation pattern and the optimum arrangement pattern.

[Effects of Operation Support System]

Next, with reference to FIG. 10, the effects of the operation support system SYS (specifically, the operation support system SYS illustrated in FIG. 8 and FIG. 9) of the present embodiment are described.

FIG. 10 is a drawing for explaining the effects of the operation support system SYS. Specifically, FIG. 10 is a drawing for explaining the effects of the operation support system SYS (the learning unit F100 provided in the shovel 100) illustrated in FIG. 8 and FIG. 9.

In this example, the shovel 100 is performing an operation of constructing a slope (a target construction surface 1001) by embankment. Normally, a slope is constructed continuously in the depth direction of FIG. 10. Therefore, the construction area is divided into multiple sections in the traveling direction of the shovel 100. When the construction is completed from the foot of the slope to the shoulder of the slope in one section, the shovel 100 moves to the adjacent section, and the construction of the adjacent section is started.

The shovel 100 discharges soil held in the bucket 6 along the slope to fill the difference between the target construction surface 1001 and the current shape of the slope.

However, in this example, the discharged soil collapses toward the foot of the slope, resulting in a shape (an actual shape 1003) different from an expected shape 1002. This is caused by, for example, a difference in the soil property or a change in the weather.

Here, the learning unit F100 of the shovel 100 performs reinforcement learning using movements, operations, and an arrangement of this time and their result (the actual shape 1003) as result information.

For example, the learning unit F100 of the shovel 100 updates the optimum operation pattern and the optimum arrangement pattern by adding a scooping operation to the soil discharging operation under the same environmental condition. As a result, a scooping operation for recovery is performed, and the soil is formed into the expected shape 1002. Then, when the construction in the next section is started, an operation pattern with a high reward under environmental information such as a similar difference in the soil property or similar weather is extracted, and the construction operation is continued based on the extracted operation pattern. Therefore, even in a recovery operation, the recovery can be quickly performed with the reinforcement learning by the learning unit F100. Also, the results in one section can be used in the next section.

Thereafter, under the control of the controller 30 (the learning unit F100), the shovel 100 performs the scooping operation together with the soil discharging operation when performing a construction work under a similar environmental condition. Thus, the shovel 100 (the controller 30) can autonomously improve an operation of the shovel 100 such that the target index (for example, work efficiency) becomes relatively high.

[Variations and Improvements]

Embodiments of the present invention are described above. However, the present invention is not limited to the specifically disclosed embodiments, and variations and modifications may be made without departing from the scope of the present invention.

For example, although the operating device 26 in the above-described embodiments is a hydraulic device that outputs a pilot pressure according to an operation by the operator, the operating device 26 may be an electric device that outputs an electric signal. In this case, the control valve system 17 may include electromagnetic pilot control valves. Also, the controller 30 can control the machine guidance function or the machine control function by directly determining the operation state based on an electric signal input from an electric operating device.

In the embodiments and variations described above, the shovel 100 uploads operation pattern result information to the management device 300, obtains an optimum operation pattern from the management device 300, and performs controls related to the machine control function based on the optimum operation pattern. However, the present invention is not limited to this example. For example, a shovel that uploads operation pattern result information to the management device 300 may be different from a shovel whose operation is to be supported by the operation support system SYS (the management device 300). In this case, the shovel that uploads the operation pattern result information to the management device 300 does not necessarily include the machine guidance function and the machine control function.

Also, in the embodiments and variations described above, operation pattern result information, environmental condition result information, and work site images are uploaded from the shovel 100 and the flying body 200 to the management device 300. However, the present invention is not limited to this example. For example, operation pattern result information, environmental condition result information, and work site images recorded in the shovel 100 and the flying body 200 may be read and stored in an external storage device outside of the shovel 100 and the flying body 200 by, for example, a service person according to a predetermined method. Then, the service person may go to a facility corresponding to the management device 300 and transfer data such as the operation pattern result information, the environmental condition result information, and the work site images from the storage device to the management device 300.

Also, in the embodiments and variations described above, operation pattern result information is formed based on detection information output from the state detection device S1 provided in the shovel 100. However, the present invention is not limited to this example. For example, the operation pattern result information may be formed based on detection information of a sensor (for example, a camera, a LIDAR, or a millimeter wave radar) that observes the operation of the shovel 100 from the outside. In this case, the detection information of the sensor may be uploaded, or recorded in a predetermined storage device and transferred to the management device 300 by a worker who visits a facility corresponding to the management device 300.

Also, in the embodiments and variations described above, the function of the optimum controller 3103 is provided in the management device 300. However, the function of the optimum controller 3103 may be provided in the shovel 100. In this case, a data set corresponding to the optimum operation pattern DB 3100D is sent from the management device 300 to the shovel 100 in advance. Also, when the optimum operation pattern DB 3100D is updated at the management device 300, an updated data set is sent from the management device 300 to the shovel 100.

Further, in the embodiments and variations described above, the shovel 100 is configured such that all of the moving components such as the lower traveling body 1, the upper rotating body 3, the boom 4, the arm 5, and the bucket 6 are hydraulically driven. However, some of the moving components may be electrically driven. That is, the configurations described in the above embodiments may also be applied to a hybrid shovel and an electric shovel.

What is claimed is:

1. An operation support system for a construction machine including an attachment, the operation support system comprising:
a memory that stores a program; and
a processor configured to execute the program stored in the memory to perform a process including
generating multiple operation patterns or multiple arrangement patterns for the construction machine under different environmental conditions with respect to each of a plurality of different types of operations including an operation that moves the attachment, such that each of the operation or arrangement patterns generated with respect to each of the plurality of different types of operations maximizes a rating regarding a predetermined target index under each of the different environmental conditions, said generating including
simulating an operation or an arrangement of the construction machine to generate an operation pattern or an arrangement pattern for the construction machine, and
performing reinforcement learning to generate an operation pattern or an arrangement pattern for the construction machine,
obtaining environmental information of the construction machine,
selecting, based on the generated operation patterns or the generated arrangement patterns, an operation pattern or an arrangement pattern that maximizes the rating regarding the predetermined target index under an environment corresponding to the obtained environmental information with respect to a type of operation specified among the plurality of different types of operations, and
outputting the selected operation pattern or arrangement pattern.

2. The operation support system for the construction machine as claimed in claim 1, wherein
the process further includes obtaining result information related to past operation results or past arrangement results of the construction machine; and
the multiple operation patterns or the multiple arrangement patterns are generated based on result information with a rating higher than or equal to a predetermined standard regarding the target index among the obtained result information.

3. The operation support system for the construction machine as claimed in claim 1, wherein the process further includes updating the multiple operation patterns or the multiple arrangement patterns based on an operation pattern or an arrangement pattern generated and used for the construction machine.

4. The operation support system for the construction machine as claimed in claim 1, wherein the processor is configured to execute the program stored in the memory to perform the process, the process further including
receiving a signal from the construction machine, the signal including the environmental information of the construction machine and specifying the type of operation among the plurality of different types of operations.

5. The operation support system for the construction machine as claimed in claim 1, wherein the plurality of different types of operations include an excavation operation, a loading operation, and a compaction operation.

6. A construction machine, comprising:
an attachment;
a memory that stores a program; and
a processor configured to execute the program stored in the memory to perform a process including
generating multiple operation patterns or multiple arrangement patterns for the construction machine under different environmental conditions with respect to each of a plurality of different types of operations including an operation that moves the attachment, such that each of the operation or arrangement patterns generated with respect to each of the plurality of different types of operations maximizes a rating regarding a predetermined target index under each of the different environmental conditions obtaining environmental information around the construction machine, outputting, based on the multiple operation patterns or the multiple arrangement patterns, an operation pattern or an arrangement pattern that maximizes the rating regarding the predetermined target index under an environment corresponding to the obtained environmental information with respect to a type of operation specified among the plurality of different types of operations, and controlling an operation of the construction machine based on the operation pattern or the arrangement pattern that is output.

7. The construction machine as claimed in claim 6, wherein the plurality of different types of operations include an excavation operation, a loading operation, and a compaction operation.

\* \* \* \* \*